March 29, 1966  G. H. DIMOND  3,242,632
CAPPING EQUIPMENT

Filed Feb. 21, 1963  8 Sheets-Sheet 1

INVENTOR.
George H. Dimond
BY Robert S. Sawburn
ATTORNEY

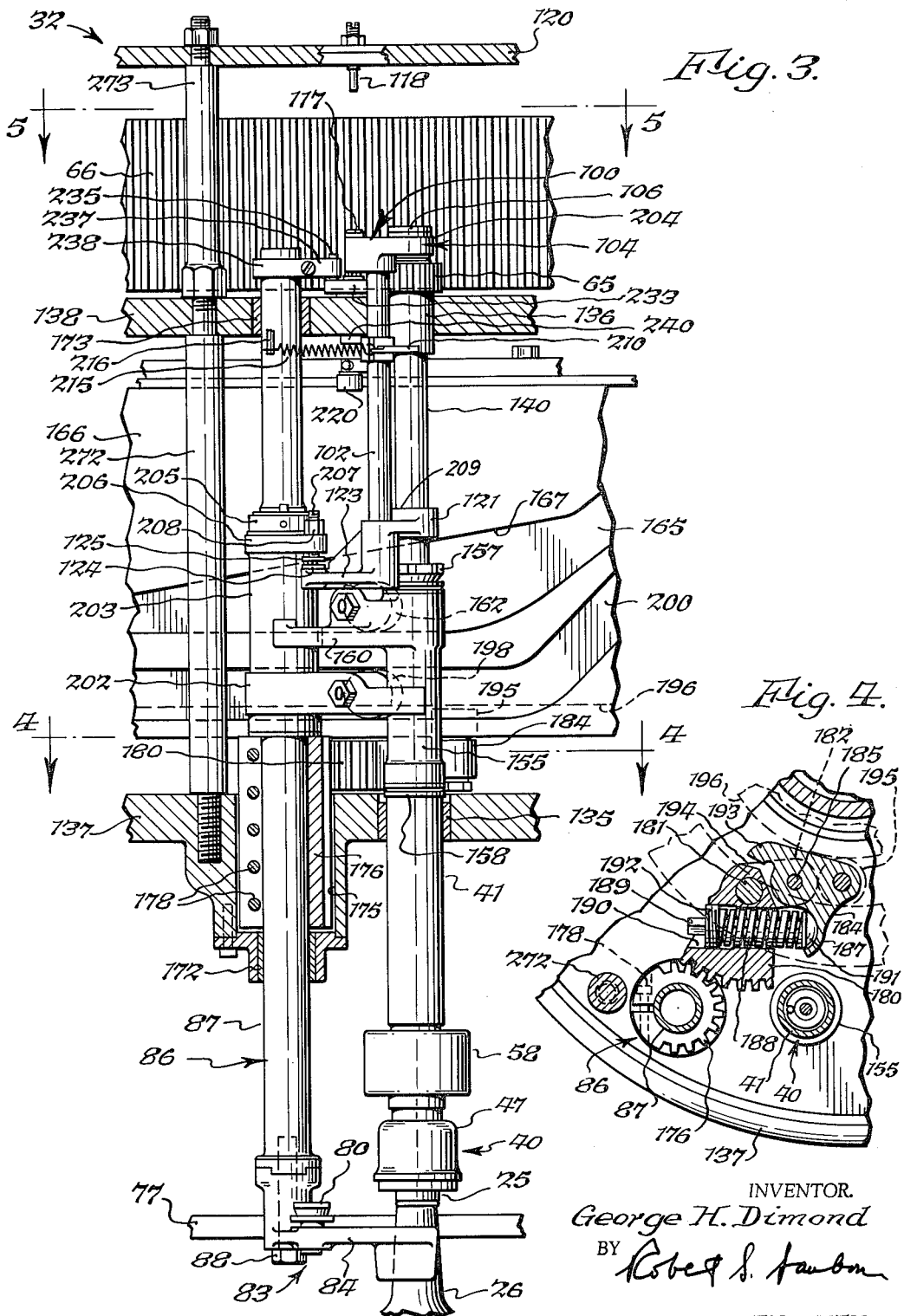

INVENTOR.
George H. Dimond
BY Robert S. Sanborn
ATTORNEY

March 29, 1966  G. H. DIMOND  3,242,632
CAPPING EQUIPMENT
Filed Feb. 21, 1963  8 Sheets-Sheet 4
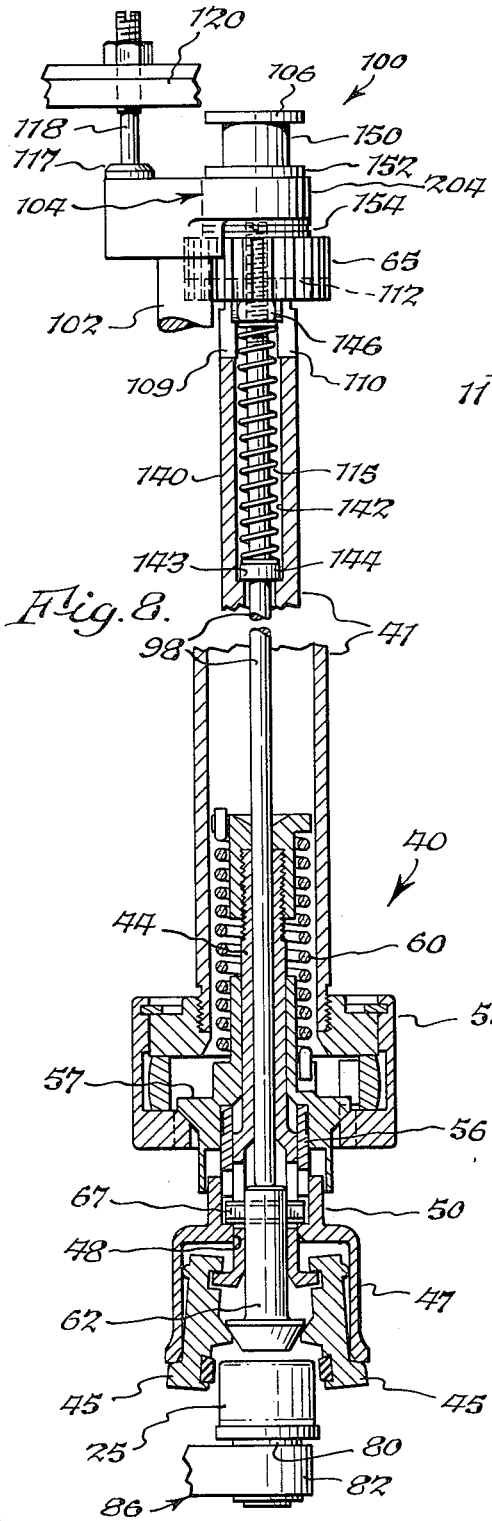
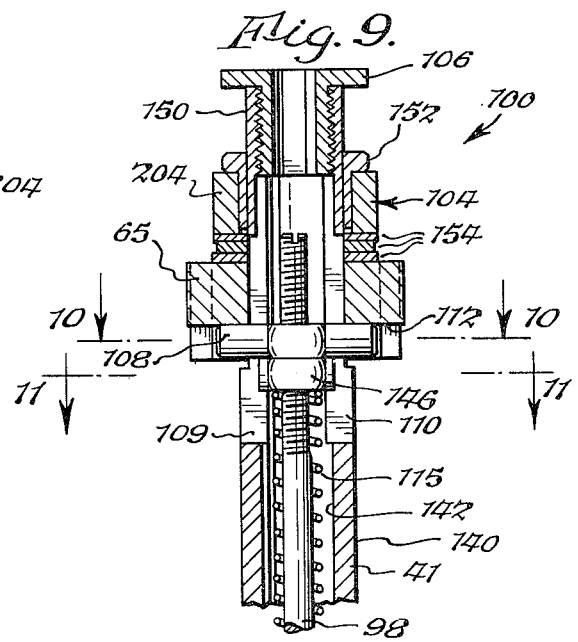
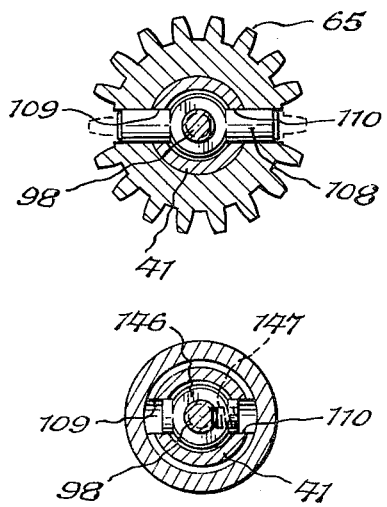
INVENTOR.
George H. Dimond
BY
Robert S. Sanborn
ATTORNEY March 29, 1966   G. H. DIMOND   3,242,632
CAPPING EQUIPMENT Filed Feb. 21, 1963   8 Sheets-Sheet 5

INVENTOR.
George H. Dimond
BY Robert S. Sanborn
ATTORNEY

March 29, 1966 G. H. DIMOND 3,242,632
CAPPING EQUIPMENT
Filed Feb. 21, 1963 8 Sheets-Sheet 6
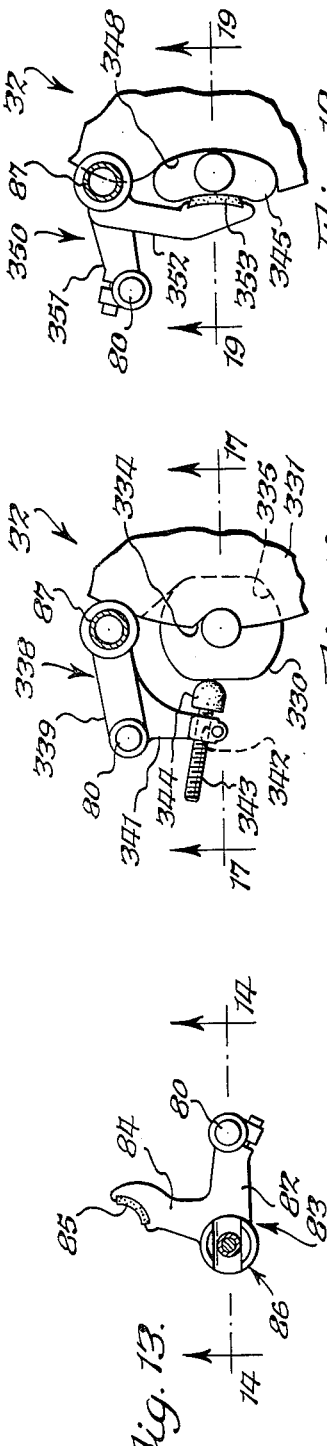
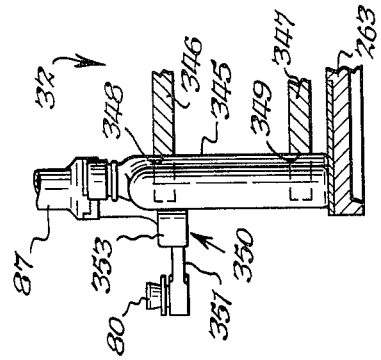
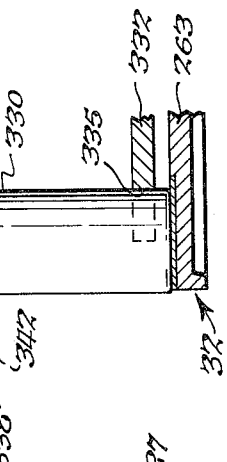
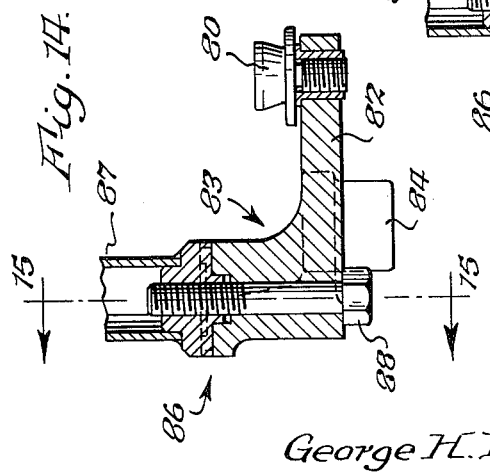
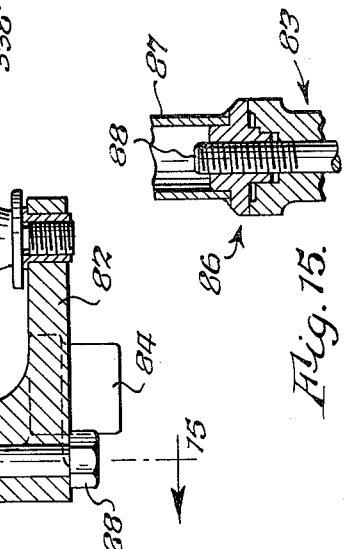
INVENTOR.
George H. Dimond
BY Robert S. Sanborn
ATTORNEY

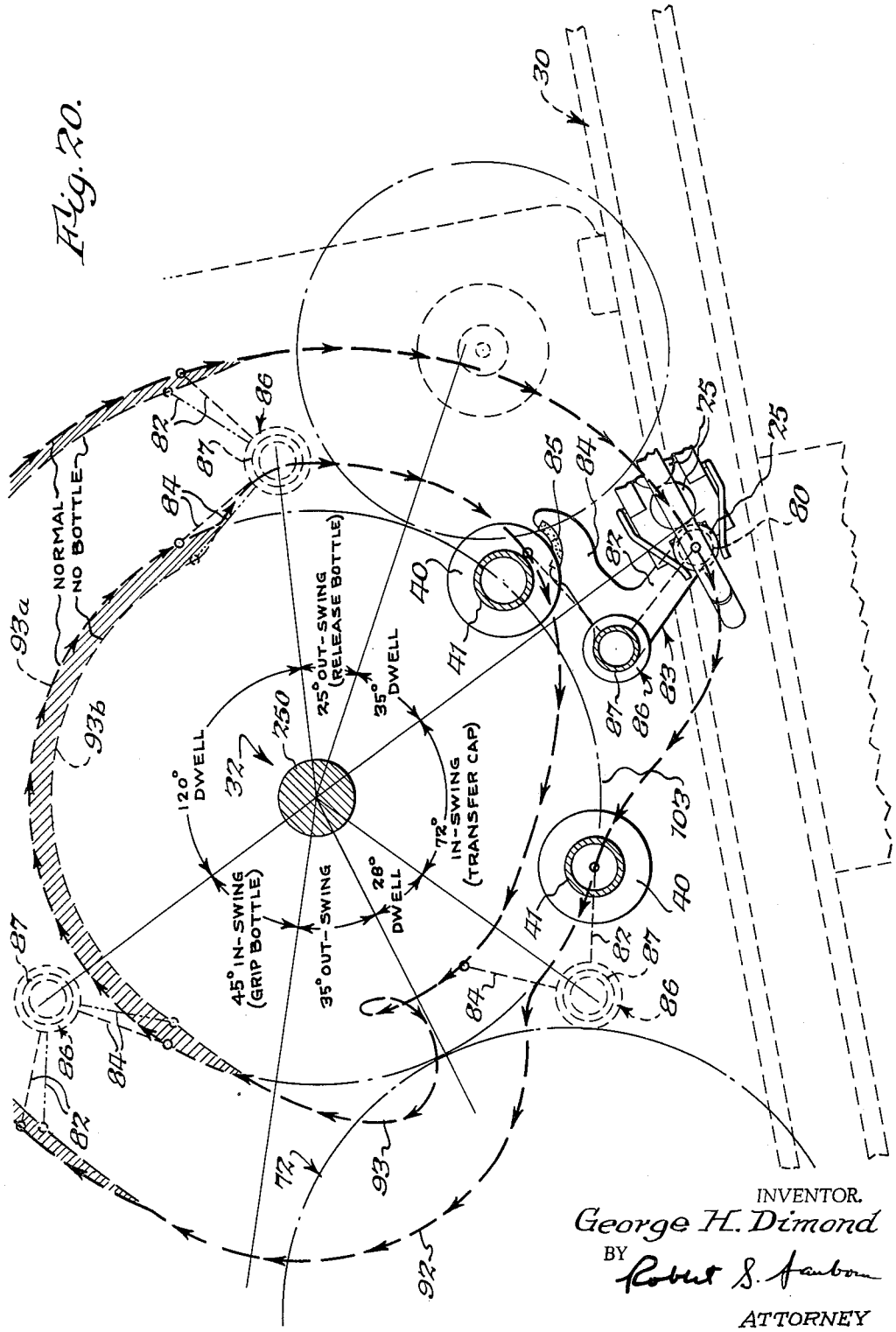

March 29, 1966 G. H. DIMOND 3,242,632
CAPPING EQUIPMENT
Filed Feb. 21, 1963 8 Sheets-Sheet 8
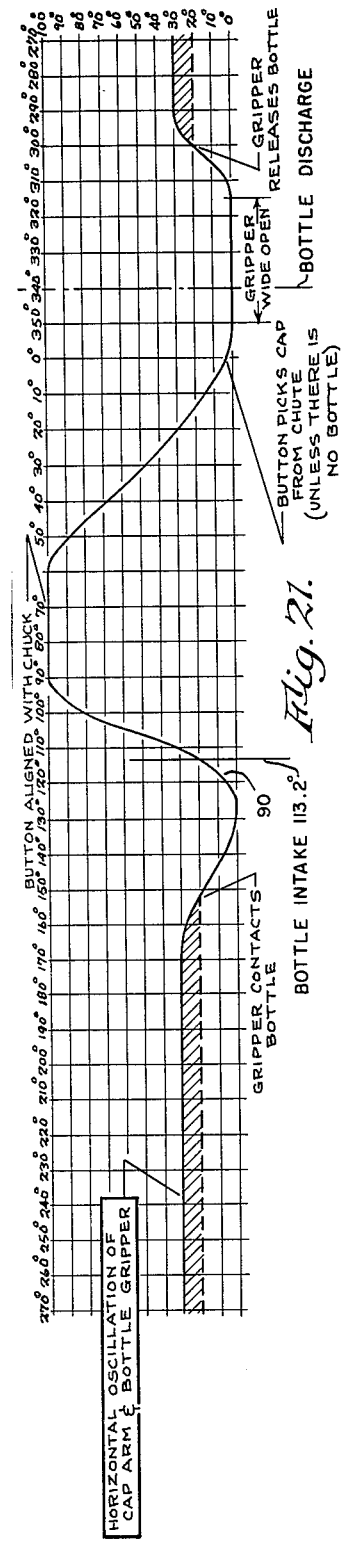
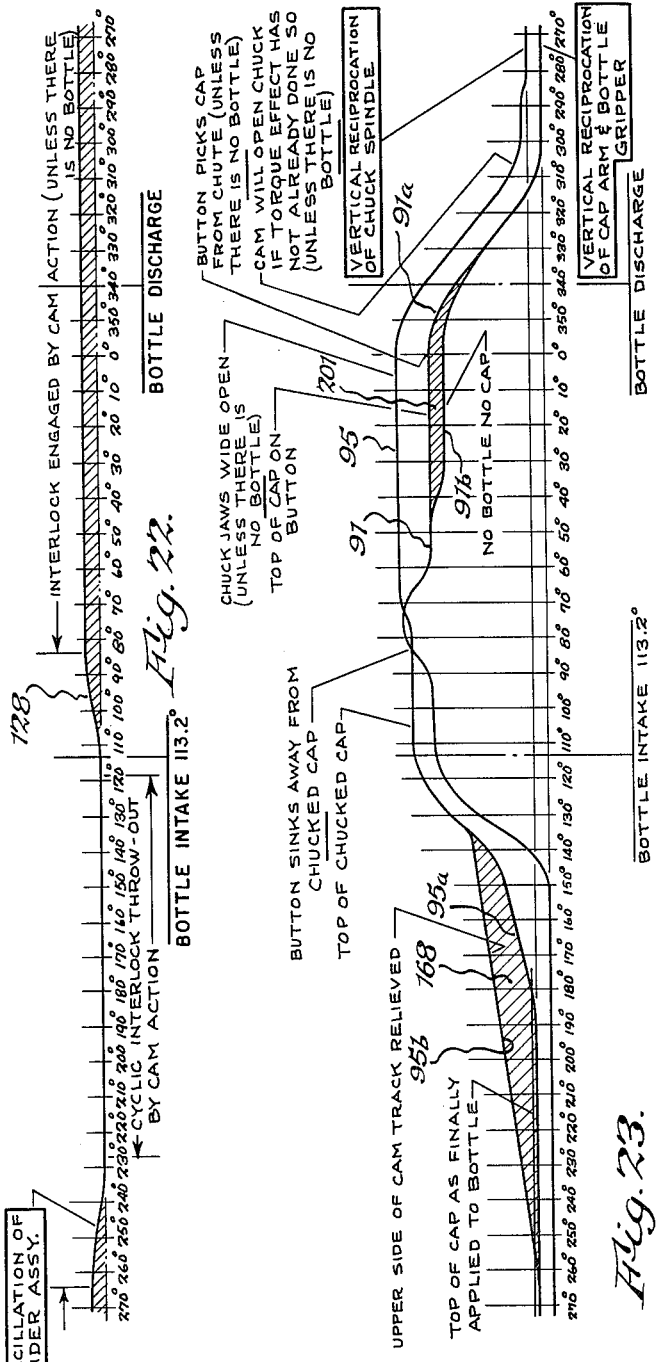
INVENTOR.
George H. Dimond
BY Robert S. Sanborn
ATTORNEY

United States Patent Office 3,242,632
Patented Mar. 29, 1966

3,242,632
CAPPING EQUIPMENT
George H. Dimond, East Aurora, N.Y., assignor to Consolidated Packaging Machinery Corporation, Buffalo, N.Y., a corporation of New York
Filed Feb. 21, 1963, Ser. No. 260,282
42 Claims. (Cl. 53—67)

This invention relates to a capping machine and more particularly to a machine which is adapted to apply caps or other closure elements to a series of containers sequentially advanced through the machine.

There has been developed a chuck for applying screw-type caps or other closure elements to containers which is extremely rapid in action and highly efficient. One such chuck is disclosed, for example, in G. H. Dimond Patent 3,031,822 issued May 1, 1962. In chucks of this type, there customarily is provided a rotary, vertically reciprocable spindle which is positioned above the container in substantial alignment therewith. A set of jaws are supported adjacent the lower end of the spindle and are arranged to grasp a cap from a suitable supply and to screw it in place on the corresponding container. At the time the cap is applied to the container with a predetermined degree of tightness, the jaws rapidly and automatically move to their open position to release the cap. Thereafter, the spindle is carried in an upward direction and contacts a vertically stationary rod member to condition the chuck for the receipt of a succeeding cap.

Heretofore, difficulties have been encountered in the provision of capping machines for use with chucks including those of the foregoing type. As a result, the maximum capabilities of such chucks have not been realized to their fullest extent. For example, particularly in cases in which comparatively small screw-type caps were to be applied to the containers at slow speeds, the chuck jaws occasionally moved to their closed position prematurely, in response to random vibrations of the machine, for example, and failed to grip the cap. Upon the reduction of the sensitivity of the jaw closing mechanism to alleviate this difficulty, the jaws sometimes failed to move to their closed position upon the presentation of the cap thereto. In addition, in many prior machines, a cap having a defective thread, for example, when applied to its container, often was not released by the jaws at the desired point in the operation cycle, with the result that the subsequent upward movement of the chuck spindle also carried the capped container in an upward direction and frequently damaged the container. Furthermore, and this has been of special moment in cases in which caps having different thread arrangements were to be applied to containers of varying sizes, difficulties heretofore were encountered in the rapid and straightforward adjustment of the machine speed and other factors to adapt the machine for the various types of caps and containers.

One general object of this invention, therefore, is to provide a new and improved capping machine which is particularly adaptable for applying screw-type caps or other closure elements to a series of containers sequentially advanced through the machine.

More specifically, it is an object of this invention to provide such a machine which is of particular utility when used with capping chucks arranged to apply the caps to the containers with a predetermined degree of tightness.

Another object of this invention is to provide a closure machine of the foregoing type in which the chucks firmly grip the caps prior to their application to the containers.

A further object of the invention is to provide such a machine in which the caps are automatically discharged from the chucks at predetermined points in the operation cycle.

Another object of this invention is to provide a machine of the character indicated in which the possibility of breaking or otherwise damaging the containers during the cap-applying operation is substantially reduced.

A still further object of this invention is to provide a capping machine which is adapted to accommodate caps and containers of widely varying sizes and shapes.

Still another object of this invention is to provide a capping machine utilizing comparatively simple mechanical elements which is economical to manufacture and thoroughly reliable in operation.

In one illustrative embodiment of the invention, there is provided a machine for applying screw-type caps to a series of containers which includes a rotary turret for receiving the containers in succession from a supply thereof. A plurality of vertically reciprocable chucks are mounted around the turret periphery above and in vertical alignment with the containers. Each of these chucks is provided with a set of jaws at its lower end and operating means including a camming member for opening and closing the jaws at predetermined points in the operation cycle. The turret includes unique means for continuously rotating each chuck to screw the caps gripped by the jaws onto their corresponding containers, and the operating means is thereupon effective to actuate the camming member to open the jaws at the time the cap is applied to its container with a predetermined degree of tightness. In addition, there are provided means including a plurality of elongated, vertically reciprocable rods, one for each chuck, which are movably supported in position to engage the camming members to insure that the chuck jaws open and close at selected points.

Certain preferred embodiments of the invention additionally include a series of vertically reciprocable arm mechanisms which are mounted on the turret adjacent the chucks and are pivotally movable with respect thereto. Each arm mechanism includes a first portion for receiving one of the container caps from a suitable supply and a second, container-engaging portion. As the turret rotates, each of the arm mechanisms pivots in a direction to move the cap on the first arm portion into position directly beneath the adjacent chuck and then rises to locate the cap between the chuck jaws. The chuck thereupon moves downwardly a short distance and grips the thus-positioned cap. Thereafter, upon the pivotal movement of the arm mechanism in the opposite direction, the chuck continues its downward movement to screw the cap in place on the corresponding container.

In accordance with one feature of several advantageous embodiments of the invention, there is provided unique control means which is responsive to the vertical positions of both the chucks and the associated arm mechanisms for controlling the dispositions of the various camming members relative to the chuck jaws at predetermined points in the operation cycle. As an illustration, in certain good embodiments the control means is effective to maintain the elongated rod for each chuck in engagement with its camming member to hold the chuck jaws in an open position until the corresponding arm mechanism moves one of the container caps therebeneath. The chuck then moves downwardly with respect to the elongated rod to enable movement of the camming member in an upward direction relative to the jaws, thus permitting the jaws to move to their closed position to grip the cap. The arrangement is such that the jaws are firmly maintained in their open position until the cap is presented thereto and are then closed to pick up the cap.

In accordance with another feature of the invention, in certain advantageous embodiments, shortly after each chuck applies a cap to the container therefor and begins to move upwardly preparatory to the receipt of a succeeding cap, the control means is again effective to move the elongated rod into engagement with the camming member and thereby open the chuck jaws. With this arrangement, the camming member in effect backs up the automatic opening of the jaws by the operating means. In cases in which a particular cap is not automatically released by the operating means after its application to the container with a predetermined degree of tightness, such as might be occasioned by a cap having defective threads, for example, the control means operates the rod and camming member to insure that the defective cap is discharged from the chuck.

In accordance with another feature of the invention, in certain preferred arrangements, after each chuck has picked up a cap from the cap-receiving portion of the associated arm mechanism, the mechanism rapidly pivots in an outward direction to swing the container-engaging portion thereof to a position remote from the container being fed to the turret. Thereafter, the mechanism moves downwardly and inwardly to urge the container into engagement with the turret and thereby hold it in a predetermined, fixed location with respect to the downwardly-moving chuck.

In accordance with a further feature of the invention, in several advantageous embodiments, each arm mechanism also serves to detect the presence or absence of a container beneath the corresponding chuck. In cases in which the container is not in position, the arm mechanism is effective to adjust the control means for the elongated rod so that the chuck jaws remain closed during their upward movement and continue to firmly grip the cap until such time as a container is in proper cap-applying position. In addition, the reciprocable movement of the arm mechanism is varied such that the cap-receiving portion thereof is spaced from the cap supply and does not receive further caps until after the cap gripped by the jaws has been applied to a container.

In accordance with still a further feature of certain embodiments of the invention, in cases in which a particular container on the turret is offset slightly, the downward movement of the chuck therefor is arrested prior to the time it reaches its lowermost position, thereby avoiding any breakage or other damage to the container.

In accordance with still another feature of the invention, in some arrangements, the machine is readily adjustable to accommodate a wide variety of screw-type caps having varying thread arrangements and is also adjustable to process containers of varying sizes and shapes.

The present invention, as well as further objects and features thereof, will be understood more clearly and fully from the following detailed description of a preferred embodiment, when read in conjunction with the accompanying drawings, in which:

FIGURE 3 is an enlarged vertical sectional view, partly in elevation, of another portion of the machine;

FIGURE 4 is a sectional view take along the line 4—4 in FIGURE 3;

FIGURE 8 is a vertical sectional view, partially broken away, of a capping chuck useful in connection with the invention, with certain cooperating parts shown in elevation;

FIGURE 9 is a fragmentary vertical sectional view of portions of the chuck and cooperating parts shown in in FIGURE 8;

FIGURE 10 is a sectional view taken along the line 10—10 in FIGURE 9, with certain parts omitted for purposes of clarity;

FIGURE 11 is a sectional view taken along the line 11—11 in FIGURE 9;

FIGURE 13 is a plan view of an arm member and associated parts useful in connection with the invention;

FIGURE 14 is a sectional view taken along the line 14—14 in FIGURE 13;

FIGURE 15 is a fragmentary sectional view taken along the line 15—15 in FIGURE 14;

FIGURE 16 is a plan view of an alternative arm member and associated parts useful with the invention, together with a representative container;

FIGURE 17 is a sectional view taken along the line 17—17 in FIGURE 16;

FIGURE 18 is a plan view of another alternative arm member and associated parts useful with the invention, together with another representative container;

FIGURE 19 is a sectional view taken along the line 19—19 in FIGURE 18;

FIGURE 20 is a diagrammatic representation of the paths of certain parts of the machine, as projected on a horizontal plane; and FIGURES 21–23 are diagrammatic representations of the vertical and angular dispositions of particular machine components.

Figures 1, 2:
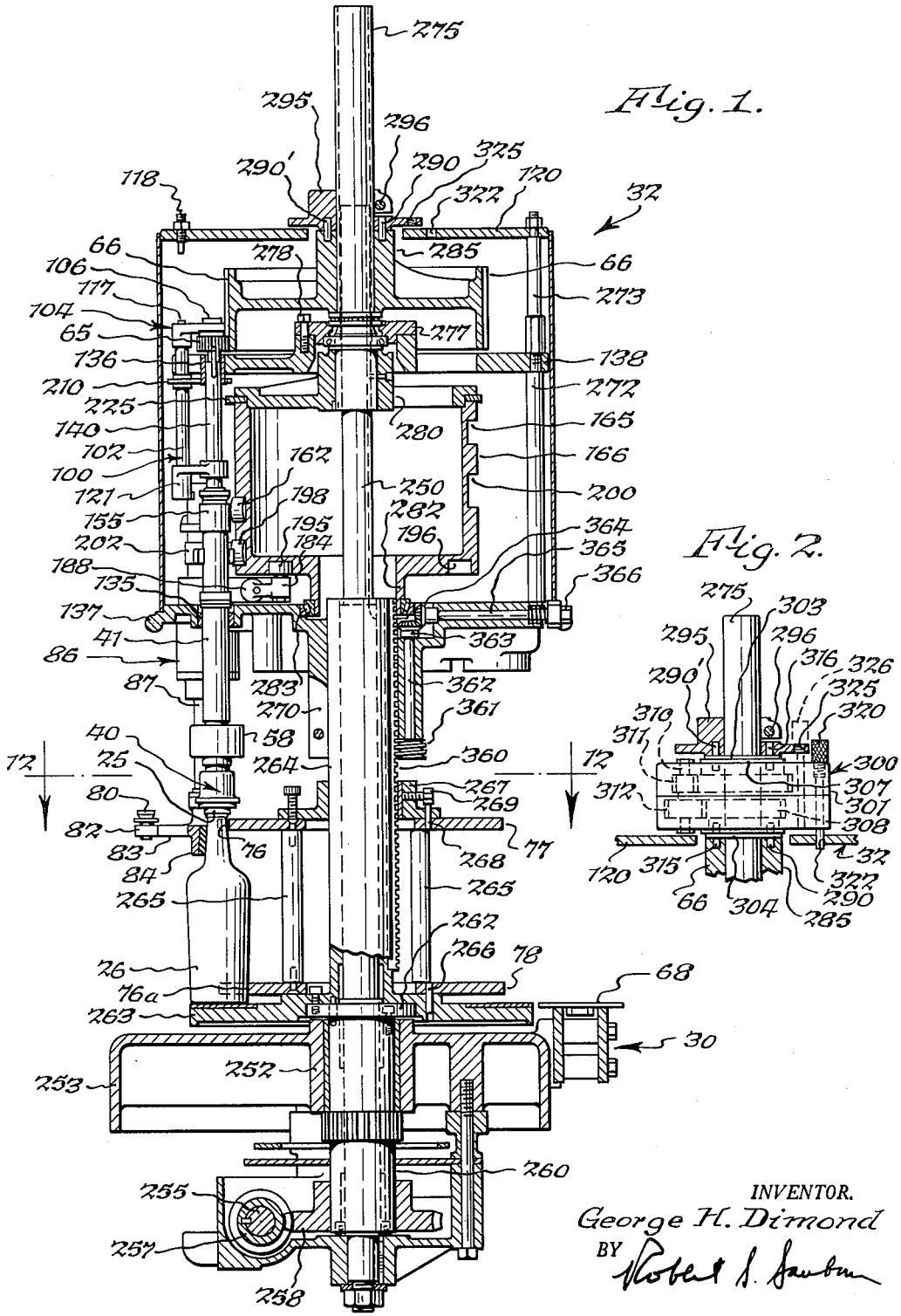
FIGURE 1 is a vertical sectional view, partly in elevation and with certain parts omitted for purposes of clarity, of a machine for applying caps or other closure elements to containers in accordance with a preferred embodiment of the invention, taken generally along the line 1—1 in FIGURE 12 but showing additional portions of the machine.
FIGURE 2 is a fragmentary vertical sectional view of a portion of the machine, together with certain additional parts.

Referring to the drawings, there is shown a machine for applying screw-type closure elements, such as the caps 25, for example, to a series of bottles 26 or other containers therefor. The machine includes a suitable feeding mechanism 30 which is arranged to position the bottles to be capped around the periphery of a continuously rotating turret 32. The various caps 25 are led from a supply thereof down a stationary chute 35 (FIGURE 12) with their tops uppermost. This chute is disposed adjacent the turret 32 in position to enable the transfer of successive caps to eight capping chucks 40 which are located around the turret periphery above the bottles 26. The chucks 40 apply the caps to the bottles, and the thus-capped bottles are then returned to the feeding mechanism 30.

In order to facilitate the description of the embodiments of the invention illustrated in the drawings, there will first be given a brief discussion of the construction and mode of operation of representative capping chucks which are of particular utility in connection with this embodiment. That is, before describing the novel machine for controlling the capping chucks 40 to apply the caps 25 to the bottles 26, a description will be given of illustrative known chucks which are suitable for use with such machine. For a more detailed discussion of representative chucks with which the present invention advantageously may be employed, reference may be had, for example, to G. H. Dimond Patent 3,031,822 referred to above.

*Chuck*

As best shown in FIGURE 8, each of the capping chucks 40 includes a vertically reciprocable hollow spindle 41 which is continuously rotated about its axis during the rotary movement of the target 32. An elongated sleeve 44 is rotatably and reciprocably positioned within the spindle 41 and is provided at its lower end with a set of jaws 45. These jaws are movable between an open position (the position shown) and a closed position in which one of the caps 25 is firmly gripped therebetween.

Surrounding the jaws 45 is a bell-shaped member 47. The member 47 includes a centrally located aperture 48 through which the sleeve 44 extends and an upstanding hub 50 around the aperture. This hub is provided with oppositely disposed pairs of stepped ledges (not visible in the drawings but shown in the aforementioned Dimond patent for example) which respectively accommodate two outwardly extending lugs on a sleeve 56 surrounding the lower portion of the elongated sleeve 44. The sleeve 56 is fixedly but adjustably secured, as by a suitable set screw, for example, to a bayonet-type coupling member 57 which in turn is connected to the lower end of the spindle 41 by a connecting mechanism 58.

An elongated coil spring 60 is disposed within the chuck spindle 41 around the sleeve 44. One end of this spring is secured to the upper end of the sleeve 44, while the lower end is affixed to the coupling member 57. The spring 60 is precompressed to urge the sleeve 44, and hence the jaws 45 and the bell-shaped member 47, in an upward direction with respect to the coupling member 57, the sleeve 56, the connecting mechanism 58 and the spindle 41. The spring also is pretorsioned in a direction to rotate the sleeve 44, the jaws and the bell-shaped member relative to the coupling member, the sleeve 56, the connecting mechanism and the spindle in the direction of the spindle's rotation. These relative motions normally are prevented by the engagement between the lugs on the sleeve 56 and one or the other pair of ledges on the bell-shaped member. In addition, with the various parts of the chuck 40 in the positions shown in FIGURE 8, the compression in the spring tends to urge the jaws upwardly relative to the bell-shaped member to bias the jaws toward their closed, cap-gripping position. In the position shown, however, the jaws are held open by a stripping or camming member 62 which is reciprocably positioned within the sleeve 44 and protrudes from the lower end thereof.

During the rotation of the turret 32, the chuck spindle 41 is continuously rotated relative thereto by a spur gear 65 at its upper end which is in meshing engagement with a stationary gear 66 (FIGURE 1) concentric with the turret. The rotary movement of the spindle 41 is transmitted to the chuck jaws 45 and the bell-shaped member 47 through the connecting mechanism 58, the coupling member 57, the coil spring 60 and the sleeve 44. Upon the presentation of one of the container caps 25 beneath the jaws 45, the jaws are carried downwardly with respect to the camming member 62 and move to their closed, cap-gripping position. As the jaws continue their downward movement, the cap is applied to one of the bottles 26 and is screwed in place. At the time the cap is applied to the bottle with a predetermined degree of tightness, the rotary movement of the jaws 45 and the bell-shaped member 47 stops momentarily, while the spindle 41 continues to rotate against the resistance of the spring 60. The spring is thereupon effective to urge the coupling member 57 and the sleeve 56 in a downward direction to move the lower surface of this sleeve into engagement with a transverse pin 67 on the camming member 62, thereby preventing upward movement of the camming member. Substantially simultaneously, the spring raises the jaws and the bell-shaped member relative to the camming member to open the jaws and release the cap. Thereafter, the spindle 41 moves upwardly away from the capped bottle and is conditioned for the receipt of a succeeding cap from the chute 35.

*Machine operation*

The bottles 26 to which the caps 25 are to be applied are either automatically or manually deposited one by one on an elongated belt 68 which forms a part of the feeding mechanism 30. The belt 68 advances the incoming bottles 26 from left to right, as viewed in FIGURE 12, toward the turret 32. As the incoming bottles move forward, they are uniformly spaced on the belt by the usual rotating helicoid 69 which extends on one side of the belt adjacent the infeed side of the turret.

Figure 12:
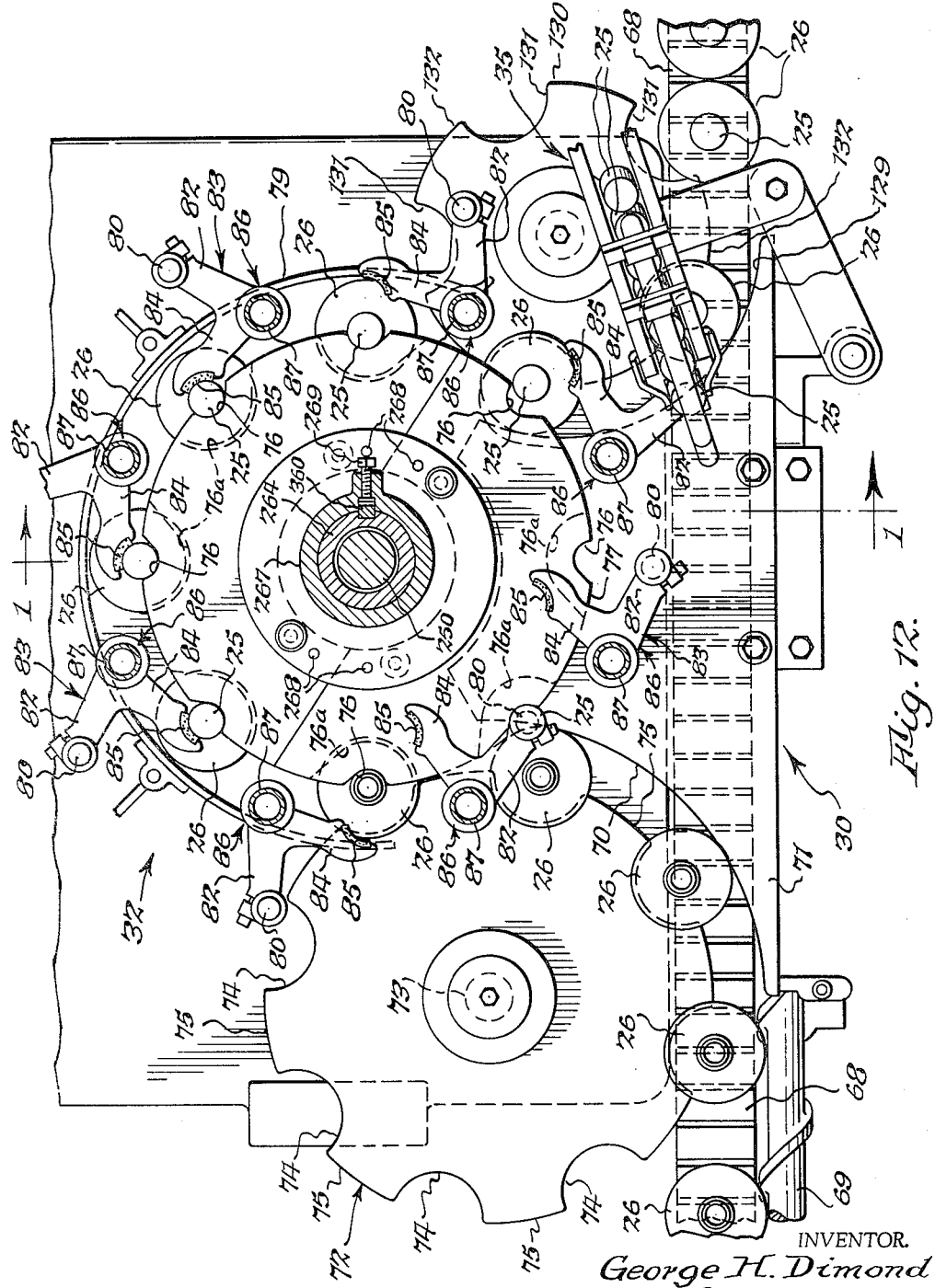
FIGURE 12 is a horizontal sectional view of the machine, with certain parts broken away, as viewed generally along the line 12—12 in FIGURE 1 but showing additional portions of the machine.

The incoming bottles 26 moving toward the turret 32 strike the arcuate edges 70 of two fixed guide plates 71, only one of which is visible in FIGURE 12. The plates 71 are mounted one above the other adjacent the central portion of the feeding mechanism 30 and serve to direct the bottles toward a pair of star wheels 72 which preferably are fabricated from plastic or similar material. The star wheels 72 are coaxially positioned on a vertical shaft 73 adjacent the infeed side of the turret 32 and are continuously rotated in a counterclockwise direction, as viewed in FIGURE 12. Each of these wheels includes eight arcuate recesses 74 of a configuration which generally conforms with a portion of the periphery of the bottles to be capped. The recesses 74 form a series of equally spaced teeth 75 on the star wheels 72 which engage the incoming bottles and transfer them from the belt 68 to the rotating turret 32. The bottles are thereupon contacted by the teeth formed by the arcuate recesses 76 and 76a of two star wheels 77 and 78, respectively. The star wheels 77 and 78 are mounted coaxially with the turret 32 and carry the incoming bottles clockwise around the turret periphery through an angle of approximately two hundred and twenty-seven degrees. The recesses 76 in the upper star wheel 77 are considerably smaller than the recesses 76a in the lower star wheel 78, and the horizontal disposition of the star wheels is such that the recesses 76 accommodate the necks of the bottles while the recesses 76a accommodate the lower or body portions thereof. A fixed, semi-circular rail 79 is concentric with the turret and serves to hold the bottles in the recesses 76 and 76a as the star wheels 77 and 78 rotate.

During the time the feeding mechanism 30 is effective to position the bottles 26 on the rotating turret 32, successive container caps 25 on the chute 35 are deposited on a series of upstanding buttons 80 adjacent the turret periphery. As best shown in FIGURES 13 and 14, each of these buttons is supported on the corresponding outer end of one arm 82 of a horizontally disposed V-shaped member 83. Each V-shaped member 83 also includes a second, bottle-gripping arm 84 which is provided adjacent its outer end with an arcuate bottle-engaging portion 85 of rubber or other resilient material. The members 83 form portions of a plurality of cap arm and bottle-gripping mechanisms 86. Eight of these mechanisms are spaced around the periphery of the turret 32 adjacent the eight capping chucks 40, and each mechanism includes a vertically disposed shaft 87 which is affixed at its lower end to the apex of the corresponding V-shaped member 83 by a machine screw 88.

The shaft 87 of each of the arm mechanisms 86 is adapted for rocking movement about its axis as it rotates with the turret 32 and is also reciprocably movable with respect thereto to control the positions of the cap button 80 and the bottle-gripper portion 85. The horizontal angular disposition of each of the mechanisms 86 as the turret rotates is illustrated schematically by the curve 90 in FIGURE 21, while the vertical disposition of each mechanism is shown schematically by the curve 91 in FIGURE 23. In these figures, the abscissas for the various points on the curves are measured in terms of degrees of rotation of the turret from a zero or reference position corresponding to the location of the discharge end of the cap chute 35. The ordinates for the points on the curve 90 in FIGURE 21 are measured in terms of degrees of rotation of the bottle-gripping arm 84 about the axis of its rock shaft 87 from a reference or open position in which the arm 84 is substantially tangent to the turret. In addition, the paths of the centers of the button 80 and the bottle-engaging arm portion 85, as projected on a horizontal plane, are shown schematically by the lines 92 and 93, respectively, in FIGURE 20.

During normal operation of the machine, as each successive cap button 80 passes beneath the chute 35, it picks up one of the caps 25. The rock shaft 87 is then rotated about its axis through an angle of approximately one hundred degrees. During this rotary movement, the turret 32 moves from about its zero degree position to its sixty degree position. The rotation of the shaft 87 carries the cap-receiving arm 82 thereon in a counterclockwise direction, as viewed in FIGURES 12 and 20, to position the cap button 80 immediately beneath the adjacent chuck 40.

At this point in the operation cycle, the adjacent chuck 40 is maintained in its uppermost position, as shown schematically by the curve 95 in FIGURE 23. In addition, the chuck camming member 62 (FIGURE 8) is held in its lower, jaw-open position by an elongated rod 98 disposed within the spindle 41. The rod 98 for each chuck 40 is vertically movable with the chuck and is also vertically reciprocable with respect thereto in response to an interlock mechanism indicated generally at 100. As best shown in FIGURES 3 and 8, each interlock mechanism 100 includes a rotatable and laterally movable shaft 102, the upper end of which is connected to a transversely extending bracket 104. The outer end of the bracket 104 is loosely positioned around the portion 150 (FIGURE 9) of the chuck spindle 41 between the spur gear 65 and a cap 106 on the spindle. The rod 98 is provided with a tranverse pin 108 adjacent its upper end which extends through two elongated slots 109 and 110 in the spindle and is disposed in a horizontally extending groove 112 in the lower surface of the gear 65. A coil spring 115 around the rod 98 urges the rod, the pin 108 and the gear 65 upwardly toward the bracket 104.

During portions of the operation cycle, the vertical movement of the elongated rod 98, the pin 108, the spur gear 65, the bracket 104 and the shaft 102 corresponds with that of the chuck spindle 41. During other portions of the cycle, however, the vertical movement of the rod, the pin, the spur gear, the bracket and the shaft is retarded to enable the spindle to move upwardly with respect thereto. Thus, as best shown in FIGURE 3, the bracket 104 is provided with a button 117 on its upper surface which is arranged to engage a vertically stationary stop pin 118 affixed to the top plate 120 of the turret 32. A second bracket 121 is secured to the lower end of the shaft 102, and this latter bracket includes an integrally formed arm 123 having a button 124 on the upper surface thereof. The button 124 is arranged to engage a mating button 125 which moves upwardly and downwardly with the adjacent cap arm and bottle-gripping mechanism 86. Engagement between either the button 117 and the stop pin 118 or between the buttons 124 and 125 serves to retard upward movement of the shaft 102, and hence the rod 98, and thereby permit upward movement of the spindle 41 relative thereto against the compression in the spring 115, for purposes that will become more fully apparent hereafter.

In the normal cycle of operation, during the time the chuck 40 is in its uppermost position the button 117 on the bracket 104 is in contact with the stop pin 118. During most of this time, the button 124 on the bracket 121 similarly remains in contact with the button 125. The vertical disposition of the chuck spindle 41 at this point is such that the lower end of the elongated rod 98 (FIGURE 8) engages the camming member 62 to maintain the chuck jaws 45 in their open position. Between the sixty and eighty degree positions (FIGURE 23) of the turret 32, the arm mechanism 86 moves upwardly a short distance to insert the cap 25 on the cap button 80 between the jaws 45. Although the initial portion of this upward movement caries the button 125 away from the button 124, the rod 98, the member 62 and the spindle 41 remain in the same relative positions because of the engagement between the button 117 and the pin 118. The configuration and vertical disposition of the member 62 with respect to the chuck jaws 45 are such that the cap 25 at no time contacts the member 62 and thus has no affect on the relative positions of the member and the jaws.

Immediately thereafter, the chuck spindle 41 moves in a downward direction, while the rod 98, together with the spur gear 65 and the bracket 104 of the interlock mechanism 100, are held in their uppermost positions by the coil spring 115. The forces exerted on the jaws 45 by the precompressed coil spring 60 maintain the member 62 in engagement with the rod 98 to enable the movement of the jaws to their closed, cap-gripping position. The rate of movement of the jaws is determined by the rate at which the spindle 41 descends. The rate of descent is sufficiently gradual so that the jaws gently but firmly grip the cap 25 on the button 80. With this arrangement, the possibility of damaging the cap or picking it up in a cocked or otherwise improper position is substantially reduced.

As the turret 32 rotates through approximately eighty degrees, the downward movement of the chuck spindle 41 is arrested, and the associated arm mechanism 86 moves downwardly a short distance to withdraw the cap button 80 from the cap 25 between the jaws 45. Shortly thereafter, the interlock shaft 102 moves in a lateral direction with respect to the turret to carry the buttons 117 and 124 out of vertical alignment with the stop pin 118 and the button 125, respectively, and thereby prevent the camming member 62 from causing premature release of the cap during the subsequent downward movement of the arm mechanism, as described more fully hereinafter. This lateral movement of the shaft 102 is indicated schematically by the curve 128 in FIGURE 22.

After the cap arm and bottle-gripping mechanism 86 has moved downwardly a sufficient distance to withdraw the button 80 from the cap 25 between the chuck jaws 45, the shaft 87 for the mechanism 86 is rapidly rotated about its axis in a clockwise direction, as viewed in FIGURES 12 and 20, through about a one hundred degree angle. As shown schematically by the line 93 in FIGURE 20, the bottle-engaging portion 85 of the mechanism 86 is thereby moved from inside a circular work path 103, defined by the axial centers of the chucks 40 and the bottles 26 at the capping stations on the turret 32, to a position which is external to this work path. After the portion 85 passes the work path, and at the time the turret rotates through an angle of one hundred thirteen and two-tenths degrees, an incoming bottle 26 is received from the star wheels 72. Thereafter, the mechanism 86 again begins to move downwardly, with the portion 85 on the outer side of the bottle, and reaches its lowermost position at the time the turret rotates through approximately one hundred and fifty degrees. During this downward movement, the shaft 87 is again pivoted about its axis in a counterclockwise direction to move the portion 85 into engagement with the adjacent portion of the bottle. The shaft 87 is spring-biased so that the portion 85 resiliently engages the bottle and urges it against the corresponding recess 76 in the upper star wheel 77. The bottle is thus held in predetermined, fixed relationship with respect to the mechanism 86 and the corresponding chuck 40.

During the pivotal and downward movement of the cap arm and bottle-gripping mechanism 86 to carry the arm portion 85 into engagement with the bottle 26, the corresponding chuck spindle 41 also moves in a downward direction. In the normal operation cycle, the spindle 41 follows a path shown schematically in FIGURE 23 by the portion 95a of the curve 95 and reaches its lowermost position as the turret 32 rotates through approximately one hundred and eighty degrees. The spindle 41 carries the chuck jaws 45 downwardly, and in the usual case the container cap 25 therebetween contacts the mouth of the bottle shortly before the downward movement of the spindle is arrested. As more fully described in the aforementioned Dimond patent, the connecting mechanism 58 (FIGURE 8) permits limited vertical and lateral movement between the spindle and the chuck jaws, thus enabling the movement of the spindle to its lowermost position without damaging the bottle.

As indicated heretofore, the spindle 41 is continuously rotated about its axis by the spur gear 65 (FIGURE 3) and the cylindrical gear 66, thus similarly rotating the cap 25 to screw it in place on the bottle 26. At the time the cap is applied to the bottle with a predetermined degree of tightness, the rotation of the jaws 45 is arrested while the spindle 41 continues to rotate against the torsion in the coil spring 60 (FIGURE 8). The chuck is thereupon effective to raise the jaws a short distance while maintaining the pin 67 on the camming member 62 in its lowermost position, thus opening the jaws and releasing the cap.

In the normal operation cycle, as the turret 32 rotates through its two hundred and forty degree position, the shaft 102 (FIGURE 3) of the interlock mechanism 100 is urged in a lateral direction with respect to the turret to again orient the buttons 117 and 124 in vertical alignment with the stop pin 118 and the button 125, respectively. After the chuck has become effective to automatically release the cap 25, the shaft 87 of the arm mechanism 86 rotates about its axis in a clockwise direction, as viewed in FIGURES 12 and 20, to disengage the portion 85 from the capped bottle and to orient the cap button 80 in position to receive a succeeding cap from the chute 35. As the turret rotates through two hundred and eighty degrees, the chuck 40 moves upwardly a short distance, for purposes that will become more fully apparent hereafter, and then, beginning at the three hundred degree position of the turret, starts to move toward its uppermost position. The associated arm mechanism 86, however, does not begin its upward movement until the turret has rotated through about three hundred and five degrees. The relative dispositions of the chuck and arm mechanism at this time are such that the button 124 engages the button 125 to hold the interlock mechanism 100, and hence the elongated rod 98 (FIGURE 8) and the camming member 62 in vertically stationary positions. The chuck spindle 41, together with the jaws 45 and the sleeve 56, momentarily move upwardly with respect to the member 62 and the bell-shaped member 47 against the compression in the coil springs 60 and 115, thereby insuring that the jaws are in their open position and conditioning the chuck for the receipt of a succeeding cap. Thus, in cases in which the jaws 45 were not automatically opened by the chuck at the time the cap 25 should have been applied to its bottle 26 with a predetermined degree of tightness, such as might be occasioned by a defective cap thread, for example, the jaws are moved to their open position through the action of the rod 98 and the member 62 prior to substantial upward movement of the chuck. As a result, the possibility of carrying the bottle upwardly into engagement with the star wheel 77 (FIGURE 1), and thereby marring or breaking the bottle, is substantially reduced.

With the buttons 124 and 125 in contact with each other, the cap arm and bottle-gripping mechanism 86 moves upwardly with the chuck 40 and follows a path shown schematically by the curve 91a in FIGURE 23. As the mechanism 86 completes this upward movement, the cap button 80 passes beneath the chute 35 and picks up a cap 25 therefrom, and the button 117 engages the stop pin 118.

Shortly before the termination of the upward movement of the chuck 40, and at the time the turret 32 rotates through an angle of three hundred and forty degrees, the capped bottle 26 on the turret engages two arcuate edges 129 (FIGURE 12) formed on the guide plates 71 opposite the edges 70. The edges 129 urge the bottle toward a pair of rotating star wheels 130. These wheels are coaxially mounted one above the other adjacent the outfeed portion of the feeding mechanism 30 and are each provided with fine recesses 131 which define a corresponding number of teeth 132. The teeth 132 engage the bottles coming from the turret and return them to the mechanism 30.

A detailed description of the machine will now be set forth.

Chuck control mechanism

As best shown in FIGURE 3, each of the chuck spindles 41 extends upwardly from the connecting mechanism 58 through two bushings 135 and 136 which are respectively mounted in a lower plate 137 and an upper plate 138 of the turret 32. The plates 137 and 138 are each of circular configuration and are horizontally disposed one above the other in spaced parallel planes. The spindle 41 includes a central portion 140 of reduced diameter having an axial bore 142 (FIGURE 8) through which the elongated rod 98 extends. This bore includes a shoulder 143 which supports an annular member 144. The lower end of the coil spring 115 rests on the member 144, while the upper spring end bears against an adjustable nut 146 which is screwed onto the threaded, upper portion of the rod 98 and is held in position by a set screw 147 (FIGURE 11). The nut 146 in turn bears upwardly against the transverse pin 108 which is loosely mounted on the threaded portion of the rod.

The uppermost portion 150 of the chuck spindle 41 is reduced and protrudes above the upper turret plate 138. A bushing 152 is interposed between the spindle portion 150 and the adjacent end of the bracket 104 to facilitate the relative movement therebetween. This bracket end is maintained in spaced relationship with the spur gear 65 therebeneath by a thrust bearing assembly 154 disposed around the portion 150. The gear 65 is slidably mounted on the portion 150 to permit relative movement between the gear and the spindle.

The turret plates 137 and 138 (FIGURE 3) continuously rotate about the axis of the turret 32 to move each of the chucks 40 around the periphery of the cylindrical gear 66. The spur gear 65 for each chuck is thus rotated about its axis to similarly rotate the transverse pin 108 in the groove 112. As indicated heretofore, the outer ends of the pin 108 extend through the two vertical slots 109 and 110 in the chuck spindle 41. The rotation of the pin is thus effective to also rotate the spindle.

Slidably positioned on the intermediate portion 140 of the chuck spindle 41 between the plates 137 and 138 is a bracket 155. The major portion of the bracket 155 is in the form of a sleeve which is prevented from substantial vertical movement with respect to the spindle 41 by two collars 157 and 158. These collars are respectively affixed to the spindle above and below the bracket. The bracket includes a laterally extending arm 160 which is provided intermediate its ends with a cam follower or roller 162. The outer end of the arm 160 is bifurcated to accommodate the adjacent cap arm and bottle-gripping mechanism 86, thereby maintaining the arm and the roller in fixed radial relationship with the center of rotation of the turret 32.

The roller 162 extends inwardly into a groove 165 in the cylindrical surface of a stationary cam 166. The cam 166 is concentric with the turret 32, and the groove 165 extends around the cam periphery along a path substantially similar to that shown schematically by the curve 95 in FIGURE 23. As the turret rotates, the roller 162 follows this path to move the bracket 155 and the chuck spindle 41 upwardly and downwardly for the various machine operations.

As has been described above, during normal operation of the machine, each of the chucks 40 is moved in a downward direction as the turret 32 rotates between about one hundred and ten degrees and one hundred and fifty degrees to position the cap 25 gripped by the jaws 45 on the mouth of the corresponding bottle 26. In cases in which the bottle mouth is not directly in line with the downwardly moving chuck, the rim of the cap 25 occasionally may strike the bottle prior to the time the chuck reaches its lowermost position. In this situation, the limited vertical movement permitted by the connecting mechanism 58 between the chuck spindle 41 and the jaw 45 in most instances is insufficient to enable the spindle 41 to move to its lowermost position without damaging the bottle. Accordingly, as the rim of a particular cap contacts a misaligned bottle, the downward movement of the spindle is arrested at an earlier point in the operation cycle until such time as the bottle-gripping arm 84 has moved into position to accurately align the bottle beneath the chuck. To accomplish this, a portion 167 of the upper side of the cam groove 165 is relieved, as shown schematically by the shaded area 168 and the curve 95b in FIGURE 23. This relieved portion extends around the cam 166 from one hundred and thirty-five degrees to two hundred and sixty degrees, measured from the cap chute 35. Upon the engagement of the rim of the cap with a misaligned bottle, the cap and its supporting chuck are prevented from further downward movement. The roller 162 rides above the lower part of the relieved portion 167 and the rim of the cap rides on the bottle until the mechanism 58 moves the jaws 45 in a lateral direction to bring the cap into proper cap-applying position. The chuck then continues its downward movement and screws the cap onto the bottle.

*Cap arm and bottle-gripping mechanism*

The rock shafts 87 for the cap arm and bottle-gripping mechanisms 86 are positioned on the turret 32 in spaced, parallel relationship with the associated chuck spindles 41. As shown schematically in FIGURE 20 by dotted lines, the rock shafts are oriented outside of the circular work path 103. With this arrangement, the bottles 26 on the turret can be disposed in close proximity with each other, thus enabling the accommodation of maximum sized bottles without interference between adjacent capping stations.

Each of the rock shafts 87 is reciprocably supported in two bushings 172 and 173 (FIGURE 3) in the turret plates 137 and 138, respectively. The lower bushing 172 is carried at the lower end of a comparatively deep recess 175 in the plate 137. An elongated gear segment 176 is disposed in this recess, and the segment extends around the shaft 87 and is fixedly secured thereto by clamp screws 178. As best shown in FIGURE 4, the segment 176 is in meshing engagement with a gear sector 180 having a substantially shorter vertical dimension. The sector 180 is pivotally supported on the upper surface of the turret plate 137 by a pin 181 and includes a laterally projecting arm portion 182. The outer end of the portion 182 is slotted to accommodate a follower member 184. This follower member is pivotally connected to the portion 182 by an upstanding pin 185 and is provided with an integrally formed extension 187 which, in the position shown, projects outwardly in a generally radial direction with respect to the turret. The extension 187 includes a recess in the form of a segment of a sphere which accommodates the mating end portion 191 of a square shaft 189 supported in a horizontally disposed, threaded aperture 190 in the sector 180. The opposite end of the shaft 189 extends through a mating aperture in a threaded member 192 in the aperture 190. The inner face of this member is engaged by the adjacent end of a precompressed coil spring 188 which surrounds the shaft between the member and the end portion 191. The member 192 is axially movable in the aperture 190 in response to rotary movement of the shaft to adjust the compression in the spring. The aperture 190 is oriented between the teeth of the gear sector 180 and the pin 181 and extends in a direction substantially parallel to the sector arm 182. A second integrally formed extension 193 on the follower member 184 is disposed on the side of the pin 185 opposite that adjacent the extension 187 in position to engage an inner flat surface 194 on the sector 180.

An upstanding roller 195 is rotatably supported by the follower member 184 on the side of the pivot pin 185 opposite that adjacent gear sector 180. The roller 195 is disposed in a groove 196 in the lower horizontal surface of the cylindrical cam 166. Although the roller and cam groove are not visible in FIGURE 4, their positions have been indicated by dotted lines. The groove 196 extends around the turret 32 and serves to vary the radial distance between the roller 195 and the turret axis. During a major portion of the operation cycle, the spring 188 maintains the extension 193 in engagement with the flat surface 194 on the gear sector 180. As the roller follows the path of the groove, it moves inwardly and outwardly to pivot the member 184 and the sector 180 about the pin 181 and thereby rotate the gear segment 176 and the rock shaft 87 in a manner generally similar to that shown schematically by the center portion of the curve 90 in FIGURE 21. Upon the rotation of the turret between its one hundred and fifty degree and three hundred degree positions, however, the extension 193 ordinarily is in spaced relationship with the surface 194. Thus, as the turret moves between about one hundred and thirty and one hundred and fifty degrees, the shaft 87 is rotated in response to outward movement of the roller 195 in a direction to move the bottle-gripping arm portion 85 into engagement with the bottle 26 and thereby firmly hold the bottle in its proper cap-applying position. As the portion 85 contacts the bottle, the rotary movement of the shaft 87 is arrested. The roller 195, however, continues to move outwardly a short distance against the compression in the spring 188, thereby pivoting the member 184 about the pin 185 to move the extension 193 away from the surface 194. The arrangement is such that the portion 85 resiliently contacts the neck of the bottle and gently but firmly urges it into position in the adjacent recess 76 (FIGURE 12) in the upper star wheel 77.

Shortly before the turret 32 reaches its three hundred degree position, the roller 195 begins to move inwardly in response to the cam groove 196, while the spring 188 expands to momentarily hold the gear sector 180, the segment 176, the rock shaft 87 and the bottle-engaging portion 85 in their bottle-gripping positions. Upon continued inward movement of the roller, the extension 193 on the follower member 184 engages the surface 194 of the sector 180 to rotate the sector, the segment, the rock shaft and the bottle-engaging portion away from the capped bottle 26.

The vertical reciprocal movement of each of the cap arm and bottle-gripping mechanisms 86 is controlled by a roller 198 (FIGURE 3) which rides in a groove 200 in the cylindrical surface of the turret cam 166. This groove is disposed beneath the chuck groove 165 and follows a path which substantially conforms with the curve 91 in FIGURE 23. The vertical dimension of the major portion of the groove 165 is substantially the same as the diameter of the roller 198. Between the three hundred and thirty-five and forty-five degree positions of the turret 32, however, the groove is relieved so that its vertical dimension is considerably greater than the roller diameter, for purposes that will become more fully apparent hereafter. This relieved portion is shown schematically by the shaded area 201 in FIGURE 23, the path of the upper surface being indicated by the curve 91a and that of the lower surface by the curve 91b.

The roller 198 is rotatably carried intermediate the ends of a laterally extending arm 202. One end of the arm 202 is bifurcated to accommodate the bracket 155 around the adjacent chuck spindle 41, while the opposite end is rigidly affixed to an upstanding sleeve 203. This sleeve is loosely positioned around the rock shaft 87 between the turret plates 137 and 138. The sleeve is prevented from substantial vertical movement with respect to the shaft 87 by the upper surface of the gear segment 176 and a collar 205 which is fixedly secured around the shaft. The upper portion of the sleeve is enlarged to form a ledge 206 which serves as a support for the interlock button 125. A threaded stub shaft 207 extends downwardly through a nut 208 and the ledge 206, and the button 125 is mounted on the lower end of this shaft, thus enabling adjustment of the vertical position of the button with respect to the button 124 on the bracket arm 123.

As the roller 198 moves upwardly and downwardly in response to the cam groove 200, the arm 202, the sleeve 203 and the shaft 87 move correspondingly to position the arm member 83 at the appropriate level for the various machine operations. In the normal operation cycle, as the turret 32 rotates from about three hundred degrees to about sixty degrees, the buttons 124 and 125 are in engagement with each other. During the time the roller 198 is disposed within the relieved portion of the groove 200, the button 124 normally acts on the button 125 to maintain the roller 198 in engagement with the upper surface of the relived portion. The shaft 87 thereby follows the path shown schematically by the curve 91a in FIGURE 23 to hold the cap button 80 at a level sufficient to receive the lowermost cap 25 in the chute 35.

*Interlock mechanism*

As indicated heretofore, during certain portions of the machine cycle the buttons 117 and 124 (FIGURE 3) for each of the interlock mechanisms 100 are positioned in vertical alignment with the corresponding stop pin 118 and the arm mechanism button 125. During other portions of the cycle, the shaft 102 of each interlock mechanism is moved in a lateral direction with respect to the turret 32 to similarly move the buttons 117 and 124 relative to the pin 118 and the button 125. The upper shaft bracket 104 includes an arm 204 having an aperture therein which accommodates the chuck spindle portion 150, while the lower shaft bracket 121 includes an arm 209 which is similarly provided with an aperture for the spindle portion 140. Upon lateral movement of the shaft 102, the brackets 104 and 121 pivot about the axis of the spindle 41 to move the buttons 117 and 124 into or out of vertical alignment with the pin 118 and the button 125.

Figure 5:
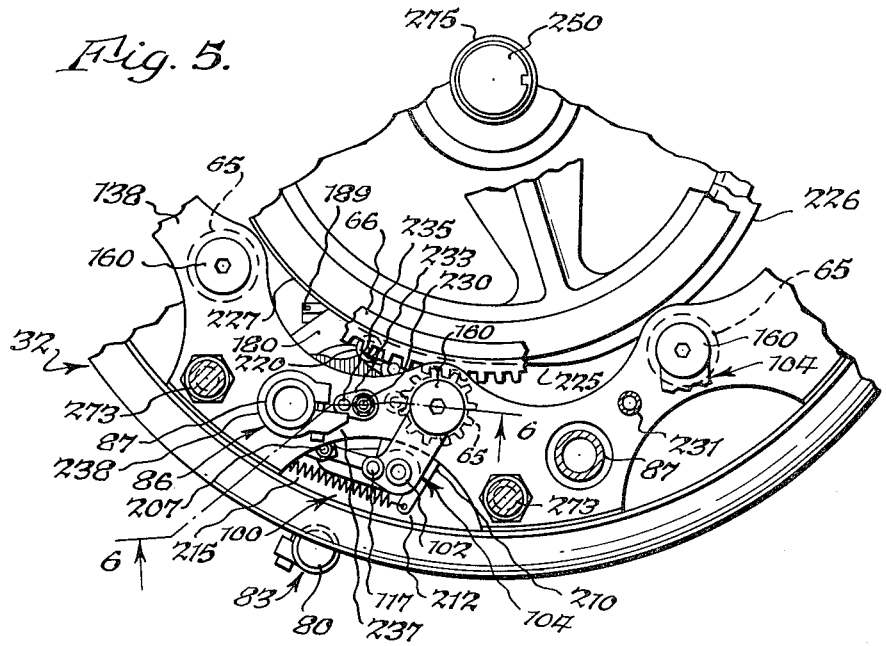
FIGURE 5 is a sectional view taken along the line 5—5 in FIGURE 3, together with certain additional parts.
Figures 6, 7:
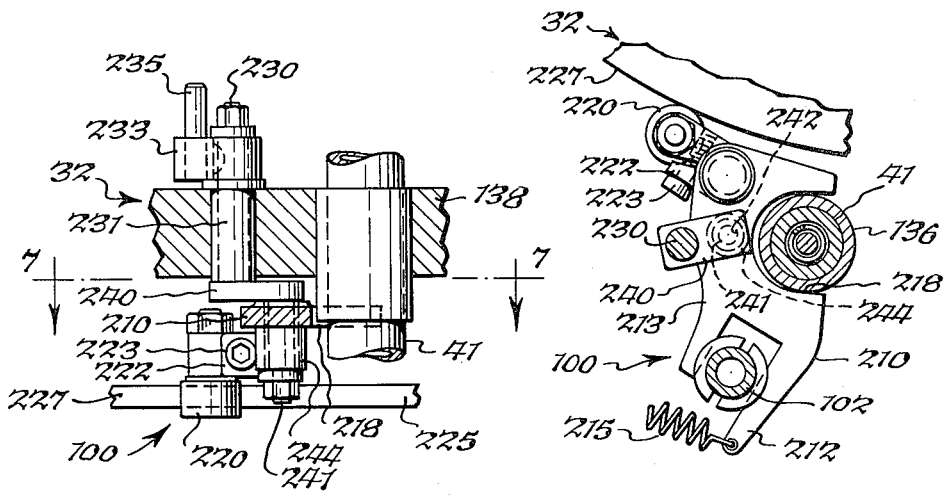
FIGURE 6 is a fragmentary sectional view taken generally along the line 6—6 in FIGURE 5.
FIGURE 7 is a sectional view taken along the line 7—7 in FIGURE 6.

The lateral movement of the shaft 102 is controlled by a horizontally disposed interlock yoke 210. The yoke 210 is in the form of an elongated flat plate which is positioned immediately beneath the turret plate 138 and extends in a generally radial direction with respect thereto. As best shown in FIGURE 7, the outer portion of the yoke 210 includes a pair of integrally formed arms 212 and 213 which are spaced apart a sufficient distance to accommodate the shaft 102 therebetween. The arm 212 is somewhat longer than the arm 213 and is connected at its outer end to one end of a biasing spring 215. The opposite end of this spring is affixed to a pin 216 (FIGURE 3) which protrudes from the lower surface of the plate 138 adjacent the shaft 87 for the corresponding arm mechanism 86. One side of the yoke 210 includes a substantially U-shaped groove 218 which is disposed around the bushing 136 for the chuck spindle 41. The spring 215 tends to urge the arm 212 in the direction of rotation of the turret (e.g., a clockwise direction, as viewed in FIGURES 5 and 7) to pivot the yoke 210, the shaft 102 and the brackets 104 and 121 about the axis of the spindle 41 and thereby bias the buttons 117 and 124 toward positions in vertical alignment with the stop pin 118 and the buttons 125.

A rotary follower 220 is supported at the inner end of the interlock yoke 210. The follower 220 is connected to the yoke 210 by a member 222 having an adjustment screw 223 thereon which serves to maintain the axis of rotation of the follower in fixed but adjustable relationship with the yoke. The follower is biased by the spring 215 into engagement with a stationary throw-out cam 225 which extends around the turret 32 and is suitably affixed to the upper surface of the cylindrical cam 166. The cam 225 is substantially circular but includes a first, protruding portion 226 and a second portion 227 of reduced diameter. The orientation of the cam with respect to the turret is such that the portion 226 is disposed between about the one hundred degree position of the turret and the two hundred and fifty degree position.

Pivotally mounted on the upper turret plate 138 between each of the chuck spindles 41 and the associated arm mechanism 86 is an upstanding pin 230. The pin 230 is carried within a sleeve 231 and is rigidly affixed adjacent its upper end to a laterally extending crank arm 233. A pin 235 on the outer end of the arm 233 extends upwardly above the plate 138 in position to be engaged by the protruding portion 237 of a bracket 238. This bracket is rigidly but adjustably secured to the upper end of the arm mechanism shaft 87 and rotates therewith.

The lower end of the pin 230 is provided with an elongated crank arm 240 extending in a direction substantially opposite to that of the crank arm 233. The outer end of the arm 240 includes a depending pin 241 which is pivotally positioned in an aperture 242 in a hub 244 integral with the interlock yoke 210. This hub is disposed in spaced juxtaposed relationship with the U-shaped slot 218, and the pin 241 protrudes through the hub and is provided with a nutted washer adjacent its lower end to retain the yoke in fixed vertical relation with respect to the turret plate 138.

During normal operation, at the time the turret 32 rotates through its zero degree position and one of the caps 25 is received from the chute 35, the rotary follower 220 is maintained in engagement with the reduced portion 227 of the throw-out cam 225 by the biasing spring 215. The positions of the interlock yoke 210, the shaft 102 and the brackets 104 and 121 at this time are such that the buttons 117 and 124 are vertically aligned with the stop pin 118 and the button 125 and are in respective engagement therewith. As the turret reaches its sixty degree position and the arm mechanism 86 moves upwardly to insert the cap received from the chute between the chuck jaws 45, the button 125 moves away from the button 124. However, the shaft 102 remains in the same relative position with respect to the chuck spindle 41 because of the engagement between the button 117 and the stop pin 118. Immediately thereafter, the spindle 41 begins its downward movement to grip the cap. The coil spring 115 (FIGURE 8) momentarily holds the button 117 in contact with the stop pin 118, and the shaft 102 is maintained in its uppermost position until the cap-gripping operation is completed. At the termination of this downward movement of the spindle, the button is spaced a short distance below the stop pin.

Shortly before the chuck spindle 41 and the associated arm mechanism 86 begin their downward movement to apply the cap 25 to the bottle 26 at the capping station therebeneath, the follower 220 rides onto the protruding portion 226 of the throw-out cam 225. The interlock yoke 210 is thereby pivoted about the axis of the spindle 41 in a counterclockwise direction, as viewed in FIGURE 7, against the biasing forces in the coil spring 215. This pivotal movement urges the shaft 102 laterally with respect to the turret to carry the buttons 117 and 124 out of respective vertical alignment with the stop pin 118 and the button 125. The arm mechanism 86 is moved downwardly at a rate in excess of the downwardly moving spindle 41 such that, had the buttons 124 and 125 not been laterally spaced from each other, they could come in contact, and the interlock mechanism 100, the gear 65, the transverse pin 108 (FIGURE 9), the nut 146, the rod 98 and the camming member 62 would move in a downward direction relative to the spindle 41, thus opening the jaws 45 and releasing the cap prematurely.

In the normal operation cycle, as the turret 32 rotates through about two hundred and fifty degrees the rotary follower 220 again moves onto the reduced portion 227 of the throw-out cam 225. The coil spring 215 thereby returns the interlock shaft 102 to its initial position in which the buttons 117 and 124 are vertically aligned with the stop pin 118 and the button 125, respectively. Between the two hundred and eighty and two hundred and ninety degree positions of the turret 32 the chuck spindle 41 moves upwardly a short distance to bring the button 124 into engagement with the button 125. Although the engagement between the buttons enables slight upward movement of the spindle 41 relative to the shaft 102, and hence the elongated rod 98 (FIGURE 8), against the forces in the coil spring 115, the camming member 62 does not affect the position of the chuck jaws 45 at this time. Thereafter, however, as the turret rotates through three hundred degrees and the chuck spindle again moves in an upward direction, the relative movement between the elongated rod and the spindle is sufficient to provide the back up action described above and to condition the chuck for the receipt of a succeeding cap 25 from the chute 35.

At about the three hundred and five degree position of the turret 32, the arm mechanism 86 begins its upward movement and, during normal operation, follows a path shown schematically by the curve 91a in FIGURE 23. As indicated heretofore, although the cam groove 200 is relieved at this point, as indicated by the shaded area 201, the button 124 normally remains in engagement with the button 125. The upwardly moving chuck spindle 41 thereby supports the arm mechanism, and the roller 198 follows the upper surface of the cam groove.

*No bottle-no cap*

In cases in which one of the bottles 26 is in position beneath the descending chuck 40, the shaft 87 of the cap arm and bottle-gripping mechanism 86 is rotated about its axis in a counterclockwise direction, as viewed in FIGURES 12 and 20, to bring the bottle-engaging portion 85 of the arm 84 into resilient engagement with the bottle. The engagement between the portion 85 and the bottle serves to arrest the rotation of the shaft 87 and to increase the compression of the coil spring 188 (FIGURE 4) in the manner described above. At this time in the operation cycle, the button 124 of the interlock mechanism 100 is laterally spaced with respect to the button 125, and the bracket 238 on the upper end of the shaft 87 is a short distance away from the upstanding pin 235 carried by the arm 233. The shaft 87 continues to hold the portion 85 in contact with the bottle as the turret rotates from about one hundred and fifty degrees to about three hundred degrees. The path of the center of the portion 85 during its engagement with the bottle is indicated schematically in FIGURE 20 by the line 93a.

In cases in which a bottle 26 is not fed to the turret 32 and is, therefore, not in position beneath the descending chuck 40, the path of the bottle-gripping portion 85 around the turret is altered in the manner shown schematically by the dotted line 93b in FIGURE 20. Thus as the shaft 87 rotates counterclockwise to move the portion 85 toward the axial center of the turret, there is no appreciable increase in the compression of the coil spring 188, and the shaft 87 carries the portion 85 to a position closer to the center of the turret than would otherwise be the case. The protruding portion 237 of the bracket 238 at this time is in close juxtaposition with the upstanding pin 235. Upon the rotation of the turret through its two hundred and forty degree position, the throw-out cam 225 ordinarily permits the lateral movement of the interlock mechanism 100 to a position in which the buttons 124 and 125 are in vertical alignment with each other. However, during the no bottle condition, this movement is prevented by engagement between the pin 235 and the bracket portion 237. The bracket portion prevents substantial pivotal movement of the pin, and hence the arm 233, (FIGURES 6 and 7), the pin 230, the arm 240, the pin 241 and the interlock yoke 210, with respect to the turret top plate 138, thereby holding the interlock shaft 102 in its outer, throw-out position to maintain the button 124 laterally spaced with respect to the button 125.

Shortly before the roller 195 (FIGURE 4) is effective to rotate the arm mechanism shaft 87 in a clockwise direction to carry the bottle-gripping portion 85 away from the axial center of the turret 32, the chuck spindle 41 moves upwardly a short distance. At this point in the operation cycle, the turret is rotating between its two hundred and eighty and two hundred and ninety degree positions. The upward movement of the spindle 41 raises the button 124 to a position above the lower surface of the button 125. Thereafter, as the shaft 87 pivots to move the gripper portion 85, and also the portion 237 of the bracket 238, away from the turret axis, the button 125 prevents the movement of the button 124 into vertical alignment therewith.

Upon the subsequent upward movement of the chuck spindle 41 and the arm mechanism 86, the buttons 124 and 125 no longer are in vertically aligned engagement with each other. The interlock mechanism 100 is thus ineffective to operate the camming member 62 (FIGURE 8) to open the jaws 45 and release the cap 25 therebetween, and the jaws continue to grip the cap until such time as one of the bottles 26 is presented therebeneath. Because the button 124 no longer provides support for the arm mechanism 86, as the arm mechanism roller 198 enters the widened portion of the cam grooves 200 the arm mechanism follows its lower path 91b (FIGURE 23). The vertical disposition of this path is such that the button 80 on the arm 82 is oriented sufficiently below the chute 35 so that the button is ineffective to receive a succeeding cap therefrom.

In the event of the continued absence of a bottle 26 beneath the chuck 40 during the next cycle of operation, the button 124 remains above and to one side of the button 125 until the arm mechanism 86 approaches its lowermost position. During the continued rotation of the turret 32, the buttons 124 and 125 are laterally spaced from each other by the action of the throw-out cam 225 and then the bracket 238 and associated pin 235, as described above. This condition continues until such time as the feeding mechanism 30 positions one of the bottles 26 on the turret beneath the chuck 40. Upon the ensuing inward movement of the bottle-gripping portion 85 into engagement with the bottle, the rotation of the shaft 87 and the bracket 238 about the shaft axis is arrested with the bracket portion 237 in spaced relationship with the pin 235. Thereafter, as the turret rotates through its two hundred and forty degree position the cam 225 is effective to permit the return of the button 124 into vertical alignment with the button 125, and the cycle of operation continues in the manner described heretofore.

*Turret*

As best shown in FIGURE 1, the turret 32 rotates about a stationary standard 250 which extends upwardly through a boss 252 on the machine base 253. A horizontally disposed drive shaft 255 is supported beneath the base 253 and is continuously rotated by an electric motor (not shown) or other suitable power source. The shaft 255 is provided with a worm 257 which is in meshing engagement with a worm gear 258. This gear is fixedly secured to an elongated sleeve 260 around the lower portion of the standard 250. A coupling ring 262 is mounted on the upper surface of the sleeve 260 immediately above the boss 252 and is rigidly secured to a circular base plate 263 which surrounds the standard and serves as a support for the bottles 26 on the turret. The base plate 263 includes an integrally formed sleeve 264 which is rotatably disposed around the standard between the base plate and the lower turret plate 137.

The star wheels 77 and 78 are maintained in spaced relationship with each other by a plurality of spacers 265. Each star wheel comprises two substantially semicircular sections so that, when the star wheels are connected together by the spacers 265, the resulting subassemblies are readily positioned around the sleeve 264. The lower star wheel 78 rests on the base plate 263 and is prevented from rotating with respect thereto by dowels 266. A hub 267 surrounds the sleeve 264 intermediate its ends and is provided with dowels 268 which similarly prevent rotation between the hub and the upper star wheel 77. This hub is affixed to the sleeve by a clamp screw 269.

The lower turret plate 137 includes a depending sleeve portion 270 which is disposed around the upper end of the sleeve 264 and rotates therewith. The plate 137 is secured to the upper plate 138 by a series of spacers 272, and this latter plate is similarly affixed to the top plate 120 by spacers 273. A stationary sleeve 275 extends upwardly through the plate 120. The lower part of the sleeve 275 surrounds the upper portion of the standard 250 and is provided with an annular member 277 which rotates thereon and is connected to the plate 138 by machine screws 278. The cylindrical cam 166 includes an upper hub 280 which is keyed to the sleeve 275 immediately beneath the member 277. The cam 166 also is provided with a lower hub 282 of somewhat larger diameter which is disposed adjacent the plate 137 and is spaced therefrom by suitable bearings 283 to facilitate the rotation of the plate with respect to the cam.

The spur gear 66 is loosely disposed around the stationary sleeve 275 immediately above the annular member 277. The gear 66 includes an upstanding hub 285 which is provided with a stud 290 protruding from the upper surface thereof. The protruding portion of this stud is disposed in a mating aperture in a clamp member 295 which surrounds the sleeve 275 above the top plate 120 and is maintained in fixed but adjustable relationship with the sleeve by a bolt 296. A second stud 290' depends from the member 295 into a corresponding aperture on the hub 295.

In operation, the shaft 255 is continuously rotated at a uniform speed to similarly rotate the worm 257, the worm gear 258, the sleeve 260, the ring 262, the base plate 263, the sleeve 264 and the star wheels 77 and 78. The rotary movement of the sleeve 264 is transmitted to the lower turret plate 137 via a rack 360, which serves as a key, and this plate in turn rotates the upper turret plate 138 and the top plate 120. The cylindrical cam 166, however, is held stationary by reason of its connection to the sleeve 275. In addition, the clamping member 295 and the studs 290 prevent rotary movement of the spur gear 66. As the rotating turret plates carry the various gears 65 on the chuck spindles 41 around the gear 66, each of the spindles rotates about its axis to screw the caps 25 on the bottles 26 in a manner described heretofore. It will of course be understood that the various gear ratios, the relative positions between the moving parts of the machine, etc., are all synchronized in proper timed relationship with each other.

The time required to apply one of the caps 25 to a bottle 26 with a predetermined tightness depends primarily on the rate of rotation of the corresponding chuck spindle 41 about its axis and the number of turns of the threads on the cap. For a given turret speed, and hence a given time within which to apply the cap to the bottle, the rate of rotation of each of the spindles 41 is readily variable to accommodate caps having threads with widely varying numbers of turns. To accomplish this adjustment, the spur gear 66 is rotated about the stationary sleeve 275 either in the direction of rotation of the turret 32 or in the opposite direction. The rotary movement of the gear 66 varies the relative movement between the gear and the axes of the individual spur gears 65 on the spindles 41, to thereby vary the speed at which the spindles rotate.

The rotary movement of the gear 66 about the sleeve 275 is controlled by a drive assembly indicated generally at 300 (FIGURE 2). The assembly 300 includes a cylindrical housing 301 having two sun gears 303 and 304 coaxially supported therein. The diameter of the sun gear 303 is greater than that of the sun gear 304, and in the position shown the gear 303 protrudes through a mating aperture in the upper surface of the housing 301. The gear 304 is mounted immediately beneath the gear 303 and protrudes through a corresponding aperture in the lower housing surface. The gears 303 and 304 are rotatably supported within the housing by bushings 307 and 308, respectively. The ends of an upstanding stub shaft 310 are journaled in the upper and lower housing surfaces adjacent the periphery thereof. This shaft is provided with a first pinion 311 in meshing engagement with the sun gear 303 and a second pinion 312 of somewhat larger diameter in meshing engagement with the sun gear 304.

In cases in which it is desired to increase the rate of rotation of each of the chuck spindles 41, such as when the threads of the caps being applied to the bottles have a greater number of turns, for example, the clamping member 295 is temporarily removed from the stationary sleeve 275, and the drive assembly 300 is placed on the sleeve in the position shown in FIGURE 2. In this position, the sun gear 304 is loosely disposed around the sleeve and is maintained in fixed relationship with the hub 285 of the gear 66 by a stud 315 depending from the gear 304 and the stud 290 on the hub. The larger diameter sun gear 303 is loosely positioned around the sleeve above the gear 304 and is prevented from rotary movement by an upstanding stud 316 thereon and the stud 290' depending from the member 295, which is now reinstalled above the assembly 300. In addition, a lock pin 320 is inserted through the gear housing 301 near its outer portion, and this pin extends downwardly through an aperture 322 in the turret top plate 120 to prevent relative rotary movement between the housing and the turret.

As the turret rotates, the housing 301 also rotates about the stationary spindle 275 at the same speed. The upper sun gear 303, on the other hand, remains stationary because of its connection to the clamp member 295. The housing carries the upper pinion 311 around the periphery of the gear 303 to rotate the pinion, the stub shaft 310 and the lower pinion 312 about the shaft axis. The rotary movement of the pinion 312 is transmitted through the lower sun gear 304 to the cylindrical gear 66. The various gear ratios are such that the gear 66 is rotated in a direction opposite to the direction of rotation of the turret. With this arrangement, as the individual spur gears 65 (FIGURE 1) move around the gear 66, the gears 65 rotate about their axes at an increased speed to similarly rotate the chuck spindles 41.

To rotate the spindles 41 at an intermediate rate, the lock pin 320 is removed from the outer portion of the housing 301 and is inserted in an aperture 325 in the stationary clamp member 295, as shown schematically in FIGURE 2 by dotted lines 326. In its new position, the pin 320 extends downwardly through a portion of the housing 301 at a point closer to the axis of rotation than when in its previous position. The pin 320 thus serves to prevent relative movement between the housing and the clamp member. Upon the rotation of the turret, the sun gears 303 and 304 and the pinions 311 and 312 likewise are prevented from moving relative to the clamp member. The cylindrical gear 66 is thereby maintained in a stationary position as the gears 65 move around its periphery, and the gears 65 are effective to rotate the spindles 41 at an intermediate rate which is the same as the rate of rotation when the assembly 300 is not used.

In cases in which the spindles 41 are to be rotated at a reduced rate of speed, the drive assembly 300 is inverted with respect to the position shown in FIGURE 2. In its inverted position, the sun gear 303 is prevented from moving relative to the cylindrical gear 66 by the studs 290' and 315, while the smaller diameter sun gear 304 is held in fixed relationship with the clamp member 295 by the studs 290 and 316. The lock pin 320 is again inserted through the outermost portion of the housing 301 and extends downwardly through the aperture 322 to prevent relative movement between the housing and the turret top plate 120. Upon the rotation of the turret, the gear 304 remains stationary, while the housing 301 rotates with the top plate 120 to move the pinion 312 around the gear 304, thus rotating the pinion 312, the shaft 310, the pinion 311, the gear 303 and the gear 66. The arrangement is such that the gear 66 rotates about the sleeve 275 in the same direction as that of the turret but at a reduced speed. The rate of rotation of each of the chuck gears 65 as they move around the gear 66 is thereby reduced. Should it be desired to rotate the gears 65 at their intermediate rate with the assembly 300 in its inverted position, the pin 320 is inserted in the position shown by the dotted lines 326.

In addition to the adjustment of the machine for the application of various types of caps or other closure elements to the bottles 26, the machine also is readily adjustable to apply the caps to other types of bottles or other containers of various shapes. To accomplish this latter adjustment, the machine screw 269 for the hub 267 is loosened, and the hub is raised slightly on the sleeve 264 to permit removal of the sub-assemblies comprising the spacers 265 and the two halves of the turret star wheels 77 and 78. In addition, the screws 88 (FIGURE 14) for the V-shaped arm members 83 are loosened to enable the removal of the members 83 from their corresponding rock shafts 87. Alternative star wheel sub-assemblies and arm members are substituted for these components to accommodate containers of substantially any desired configuration.

As an illustration, should the containers to be capped have substantially flat sides, such as the bottle 330 (FIGURES 16 and 17), for example, star wheel sub-assemblies including an upper star wheel 331 and a lower star wheel 332 are disposed around the sleeve 264 and are held in place by the hub 267. The configuration of these star wheels is generally similar to that of the star wheels 77 and 78, but the wheels 331 and 332 are provided with recesses 334 and 335, respectively, which are shaped to conform to the portion of the bottle 330 thereadjacent. To firmly hold the bottles 330 against the wheels 331 and 332 during the cap-applying operation, the rock shafts 87 are each provided with an alternative arm member 338. The member 338 is of substantially L-shaped configuration, and the outer end of one arm 339 thereof is fixedly secured to the lower end of the shaft 87 by the machine screw 88. The cap button 80 is mounted on an upright standard 340 at the apex of the member 338. The remaining arm 341 of the member 338 includes a threaded opening 342 at its outer end which adjustably accommodates a bottle-engaging member 343. A resilient cushion 344 on the member 343 engages the adjacent flat surface of the bottle 330 to firmly hold the bottle in its proper position during the application of a container cap thereto.

In a similar manner, in cases in which the containers to be capped have concave surfaces, as shown by the bottles 345 in FIGURES 18 and 19, for example, alternative star wheel sub-assemblies including two star wheels 346 and 347 are substituted for the sub-assemblies on the machine. The star wheels 346 and 347 are respectively provided with recesses 348 and 349 corresponding to the concave shape of the bottle. Additionally, a series of arm members 350 are mounted at the lower ends of the rock shafts 87. Each arm member 350 is substantially V-shaped and is affixed at its apex to the corresponding shaft 87 by one of the machine screws 88. The cap button 80 is supported on one arm 351 of the member 350, while the other arm 352 includes a resilient, bottle-engaging portion 353. The portion 353 is curved to conform to the adjacent concave surface of the bottle 345.

The machine also is readily adjustable for the application of closure elements to containers of widely varying heights. To effect this adjustment, star wheel sub-assemblies having spacers of appropriate length are mounted around the sleeve 264 (FIGURE 1), and the vertical disposition of the lower turret plate 137 relative to this sleeve is varied to move the chucks 40 and the arm mechanisms 86, together with associated parts, either upwardly or downwardly with respect to the base plate 263. The sleeve 264 is provided with a vertically disposed rack 360 which accommodates a pinion 361 affixed to the lower end of a shaft 362. The shaft 362 is journaled in a portion of the turret plate sleeve 270 and extends upwardly from the pinion 361 to a bevel gear 363 mounted at the upper end of the shaft. A second bevel gear 364 is in meshing engagement with the gear 363 and is secured to one end of a radially extending shaft 365. This latter shaft is journaled in the plate 137, and its outer end is provided with a socket 366 which accommodates a removable crank handle (not shown) or other rotating means.

As the turret 32 rotates, the rack 360 and the pinion 361 hold the sleeves 264 and 270 in fixed relationship with each other. Should it be desired to change the containers being capped from, say, pint bottles to quart bottles, the machine is shut down, and the shaft 365 is rotated to rotate the bevel gears 363 and 364, the shaft 362 and the pinion 361 in a direction to raise the turret plate 137 relative to the sleeve 264. In addition, the star wheel sub-assemblies are replaced in the manner described above by alternative sub-assemblies having spacers of increased length.

Similarly, to lower the turret plate 137 and thereby accommodate containers of reduced height, the shaft 365 is rotated in the opposite direction to move the sleeve 270 downwardly with respect to the sleeve 264, and the star wheel sub-assemblies having correspondingly shorter spacers are positioned on the base plate 263. The arrangement is such that the machine is readily adjustable in a rapid and straightforward manner to apply the caps to bottles or other containers of extremely wide height variations.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In a machine for applying a closure element to a container, in combination, a vertically reciprocable chuck disposed above said container in substantial vertical alignment therewith, said chuck having jaw means at its lower end and operating means including a jaw-engaging member for opening and closing said jaw means, means for positioning said closure element between said chuck and said container, means for thereafter moving said chuck in a downward direction toward said container to apply said closure element thereto, and control means supported by said chuck and reciprocably movable with respect thereto for preventing downward movement of said jaw-engaging member during a portion of the downward movement of said chuck, to enable movement of said jaw means relative to said member to close said jaw means and thereby grip said closure element.

2. In a machine for applying a closure element to a container, in combination, a vertically reciprocable chuck disposed above said container in substantial vertical alignment therewith, said chuck having jaw means at its lower end and operating means including a camming member for opening and closing said jaw means, means for positioning said closure element between said chuck and said container, means for thereafter moving said chuck in a downward direction toward said container to apply said closure element thereto, control means supported by said chuck and reciprocably movable with respect thereto for maintaining said camming member in a vertically stationary position during a portion of said downward movement, to enable movement of said jaw means beneath said member to close said jaw means and thereby grip said closure element, and means for moving said control means in a lateral direction with respect to said chuck to prevent relative reciprocable movement therebetween at a predetermined point in the machine cycle.

3. In a machine for applying a closure element to a container, in combination, a vertically reciprocable chuck disposed above said container in substantial vertical alignment therewith, said chuck having jaw means at its lower end and operating means including a jaw-engaging member for opening and closing said jaw means, means for positioning said closure element between said chuck and said container, means for thereafter moving said chuck in a downward direction toward said container to apply said closure element thereto, and control means supported by said chuck for movement therewith and also for movement with respect thereto, said control means maintaining said jaw-engaging member in a vertically stationary position during a portion of said downward movement, to enable movement of said jaw means beneath said member to close said jaw means and thereby grip said closure element, said operating means automatically opening said jaw means upon the application of said closure element to said container with a predetermined tightness.

4. In a machine for applying a closure element to a container, in combination, a rotary, vertically reciprocable chuck disposed above said container in substantial vertical alignment therewith, said chuck having jaw means at its lower end and operating means including a camming member for opening and closing said jaw means, means for positioning said closure element between said chuck and said container, means for thereafter moving said chuck in a downward direction toward said container to apply said closure element thereto, and control means supported by said chuck for movement therewith and also for movement with respect thereto, said control means preventing downward movement of said camming member during a portion of the downward movement of said chuck, to enable movement of said jaw means relative to said member to close said jaw means and thereby grip said closure element, said operating means automatically opening said jaw means upon the application of said closure element to said container with a predetermined tightness.

5. In a machine for applying a closure element to a container, in combination, a vertically reciprocable chuck disposed above said container in substantial vertical alignment therewith, said chuck having jaw means at its lower end and operating means including a jaw-engaging member for opening and closing said jaw means, means for positioning said closure element between said chuck and said container, means for moving said chuck in a downward direction toward said container to apply said closure element thereto and for thereafter returning said chuck to its uppermost position, and control means movable with said chuck and also reciprocably and laterally movable with respect thereto for maintaining said jaw-engaging member in a vertically stationary position during a portion of said downward movement, to enable movement of said jaw means beneath said member to close said jaw means and thereby grip said closure element, said operating means automatically opening said jaw means upon the application of said closure element to said container with a predetermined tightness.

6. In a machine for applying a closure element to a container, in combination, a rotary, vertically reciprocable chuck disposed above said container in substantial vertical alignment therewith, said chuck having jaw means at its lower end and operating means including a jaw-engaging member for opening and closing said jaw means, means for positioning said closure element between said chuck and said container, means for thereafter moving said chuck in a downward direction toward said container to apply said closure element thereto, control means supported by said chuck for movement therewith and also for reciprocable movement with respect thereto, said control means maintaining said jaw-engaging member in a vertically stationary position during a portion of said downward movement, to enable movement of said jaw means beneath said member to close said jaw means and thereby grip said closure element, said operating means automatically opening said jaw means upon the application of said closure element to said container with a predetermined tightness, and means for moving said control means in a lateral direction with respect to said chuck to prevent relative reciprocable movement therebetween.

7. In a machine for applying a closure element to a container, in combination, a vertically reciprocable chuck disposed above said container in substantial vertical alignment therewith, said chuck having jaw means at its lower end and operating means including a camming member for opening and closing said jaw means, means for positioning said closure element within said jaw means, means for moving said chuck downwardly toward said container to apply said closure element thereto and for thereafter returning said chuck to its uppermost position, and control means movable with said chuck and also movable with respect thereto for maintaining said camming member in a vertically stationary position during an initial portion of the upward movement of said chuck, to condition said operating means for the receipt of a succeeding closure element by said jaw means.

8. In a machine for applying a closure element to a container, in combination, a vertically reciprocable chuck disposed above said container in substantial vertical alignment therewith, said chuck having jaw means at its lower end and operating means including a jaw-engaging member for opening and closing said jaw means, means for positioning said closure element within said jaw means, means for moving said chuck downwardly toward said container to apply said closure element thereto and for thereafter returning said chuck to its uppermost position, said operating means automatically opening said jaw means upon the application of said closure element to said container with a predetermined tightness, and control means supported by said chuck for movement therewith and also for movement with respect thereto, said control means maintaining said jaw-engaging member in a vertically stationary position during an initial portion of the upward movement of said chuck, to condition the same for the receipt of a succeeding closure element.

9. In a machine for applying a closure element to a container, in combination, a rotary, vertically reciprocable chuck disposed above said container in substantial vertical alignment therewith, said chuck having jaw means at its lower end and operating means including a jaw-engaging member for opening and closing said jaw means, means for positioning said closure element within said jaw means, means for moving said chuck downwardly toward said container to apply said closure element thereto and for thereafter returning said chuck to its uppermost position, said operating means automatically opening said jaw means upon the application of said closure element to said container with a predetermined tightness, and control means supported by said chuck for movement therewith and also for reciprocable and lateral movement with respect thereto, said control means maintaining said jaw-engaging member in a vertically stationary position during an initial portion of the upward movement of said chuck, to condition said operating means for the receipt of a succeeding closure element by said jaw means and to insure that said jaw means are in their open position.

10. In a machine for applying a closure element to a container, in combination, a vertically reciprocable chuck disposed above said container in substantial vertical alignment therewith, said chuck having jaw means at its lower end and operating means including a camming member for opening and closing said jaw means, means for inserting said closure element within said jaw means, means for moving said chuck downwardly toward said container to apply said closure element thereto and for thereafter returning said chuck to its uupermost position, said operating means automatically opening said jaw means upon the application of said closure element to said container, and control means movable with said chuck and also movable with respect thereto for preventing downward movement of said camming member during a portion of the downward movement of said chuck, to enable movement of said jaw means relative to said member to close said jaw means upon the insertion of said closure element therein, and for preventing upward movement of said camming member during a portion of the upward movement of said chuck, to enable movement of said jaw means relative to said member to insure that said jaw means are in their open position.

11. In a machine for applying a closure element to a container, in combination, a vertically reciprocable chuck disposed above said container in substantial vertical alignment therewith, said chuck having jaw means at its lower end and operating means including a jaw-engaging member for opening and closing said jaw means, means for inserting said closure element within said jaw means, means for moving said chuck downwardly toward said container to apply said closure element thereto and for thereafter returning said chuck to its uppermost position, said operating means automatically opening said jaw means upon the application of said closure element to said container, and control means supported by said chuck for movement therewith and also for movement with respect thereto, said control means maintaining said jaw-engaging member in a vertically stationary position during a portion of the downward movement of said chuck, to enable movement of said jaw means beneath said member to close said jaw means upon the insertion of said closure element therein, and said control means also maintaining said jaw-engaging member in a vertically stationary position during an initial portion of the upward movement of said chuck, to condition said operating means for the receipt of a succeeding closure element by said jaw means and to insure that said jaw means are in their open position.

12. In a machine for applying a screw-type closure element to a container, in combination, a rotary, vertically reciprocable chuck disposed above said container in substantial vertical alignment therewith, said chuck having jaw means at its lower end and operating means including a camming member for opening and closing said jaw means, means including an elongated, vertically reciprocable rod carried by said chuck in position to engage said camming member, means for inserting said closure element within said jaw means, means for moving said chuck downwardly toward said container to apply said closure element thereto and for thereafter returning said chuck to its uppermost position, said operating means automatically moving said camming member in a direction to open said jaw means upon the application of said closure element to said container, and control means supported by said chuck for controlling the reciprocable, vertical movement of said elongated rod, said control means positioning said rod such that said camming member remains in a vertically stationary position during a portion of the downward movement of said chuck, to enable movement of said jaw means beneath said member to close said jaw means upon the insertion of said closure element therein, and said control means also positioning said rod such that said camming member remains in a vertically stationary position during an initial portion of the upward movement of said chuck, to condition said operating means for the receipt of a succeeding closure element by said jaw means and to insure that said jaw means are in their open position.

13. In a machine for applying a cap to a container, in combination, a rotary, vertically reciprocable chuck disposed above said container in substantial vertical alignment therewith, said chuck having jaw means thereon and operating means including a jaw-engaging member for opening and closing said jaw means, means for inserting a container cap within said jaw means, means for moving said chuck downwardly toward said container to apply said cap thereto and for thereafter returning said chuck to its uppermost position, said operating means automatically opening said jaw means upon the application of said cap to said container with a predetermined tightness, control means movable with said chuck and also reciprocably movable with respect thereto, said control means maintaining said jaw-engaging member in a vertically stationary position during a portion of the downward movement of said chuck, to enable movement of said jaw means beneath said member to close said jaw means upon the insertion of said cap therein, and said control means also maintaining said jaw-engaging member in a vertically stationary position during an initial portion of the upward movement of said chuck, to condition the same for the receipt of a succeeding cap and to insure that said jaw means are in their open position, and means for moving said control means in a lateral direction with respect to said chuck to prevent relative reciprocable movement therebetween.

14. In a machine for applying closure elements to containers, in combination, means for advancing successive containers from a supply thereof along a portion of a substantially circular work path at a capping station, a vertically reciprocable chuck supported above said station, said chuck having jaw means at its lower end and operating means for opening and closing said jaw means, means including a rock shaft reciprocably supported adjacent said chuck along a vertical axis outside said circular work path, said last-mentioned means having a container-engaging portion laterally movable into contact with a container at said station, a source of closure elements for said containers, means for receiving a closure element from said source and inserting the same within said jaw means, control means operatively associated with said chuck for actuating said operating means to close said jaw means upon the insertion of said closure element therein, means for moving said chuck downwardly toward said capping station to apply said closure element to a container at said station, said operating means opening said jaw means upon the application of said closure element to said container, and means responsive to the improper positioning of a container at said capping station for enabling said chuck to remain above its lowermost, cap-applying position until the container is properly located at said station.

15. In a machine for applying closure elements to containers, in combination, means for advancing successive containers from a supply thereof along a portion of a substantially circular work path at a capping station, a vertically reciprocable chuck supported above said station, said chuck having jaw means at its lower end and operating means for opening and closing said jaw means, means including a rock shaft reciprocably supported adjacent said chuck along a vertical axis outside said circular work gaging portion laterally movable into contact with a container at said station, a source of closure elements for said containers, means for receiving a closure element from said source and inserting the same within said jaw means, first control means for moving said chuck downwardly toward said capping station to apply said closure element to a container at said station, said operating means opening said jaw means upon the application of said closure element to said container, second control means for pivoting said shaft in a direction to move said container-engaging portion into contact with the container at said station to hold the same beneath said chuck during the application of said closure element thereto, and means responsive to the improper positioning of a container at said capping station for enabling said chuck to remain above its lowermost, cap-applying position until the container is properly located at said station.

16. In a capping machine, in combination, means for advancing successive containers from a supply thereof along a portion of a substantially circular work path at a capping station, a vertically reciprocable chuck supported above said station, said chuck having jaw means at its lower end and operating means including a camming member for opening and closing said jaw means, means including a rock shaft reciprocably supported adjacent said chuck along a vertical axis outside said circular work path, said last-mentioned means having a container-engaging portion laterally movable into contact with a container at said station, a source of caps for said containers, feeding means movably mounted adjacent said chuck for receiving a cap from said source and inserting the same within said jaw means, first control means for moving said chuck downwardly toward said capping station to apply the cap within said jaw means to a container at said station, said operating means opening said jaw means upon the application of each said cap to its container, second control means supported by said chuck and reciprocably movable with respect thereto for maintaining said camming member in a vertically stationary position during a portion of the downward movement of said chuck, to enable movement of said jaw means beneath said member to close said jaw means and thereby grip said cap, and means responsive to the improper positioning of a container at said capping station for enabling said chuck to remain above its lowermost, cap-applying position until the container is properly located at said station.

17. In a machine for applying closure elements to containers, in combination, means for advancing successive containers from a supply thereof to a capping station, a vertically reciprocable chuck supported above said station, said chuck having jaw means at its lower end and operating means including a camming member for opening and closing said jaw means, a source of closure elements for said containers, feeding means for receiving a closure element from said source and inserting the same within said jaw means, first control means for moving said chuck downwardly toward said capping station to apply the closure element within said jaw means to a container at said station, said operating means automatically opening said jaw means upon the application of said closure element to said container with a predetermined tightness, second control means supported by said chuck and reciprocably movable with respect thereto for maintaining said camming member in a vertically stationary position during a portion of the downward movement of said chuck, to enable movement of said jaw means beneath said member to close said jaw means and thereby grip said closure element, and means responsive to the absence of a container at said capping station for preventing the receipt of a succeeding closure element by said feeding means until a container is advanced to said station.

18. In a capping machine, in combination, means for advancing successive containers from a supply thereof along a portion of a substantially circular work path at a capping station, a vertically reciprocable chuck supported above said station, said chuck having jaw means at its lower end and operating means for opening and closing said jaw means, means including a rock shaft reciprocably supported adjacent said chuck along a vertical axis outside said circular work path, said last-mentioned means having a container-engaging portion laterally movable into contact with a container at said station, a source of caps for said containers, feeding means mounted in juxtaposition with said chuck and pivotally movable about the axis of said shaft to a position adjacent said source for receiving a cap therefrom and inserting the same within said jaw means, first control means for moving said chuck downwardly toward said capping station to apply the cap within said jaw means to a container at said station, said operating means opening said jaw means upon the application of each said cap to its container, second control means movably supported by said chuck for conditioning the same for the receipt of a succeeding cap from said source, and means responsive to the absence of a container at said capping station for rendering said second control means ineffective to condition said chuck and for preventing movement of said feeding means to its position adjacent said source, to thereby prevent the receipt of said succeeding cap by said chuck until a container is advanced to said capping station.

19. In a capping machine, in combination, means for advancing successive containers from a supply thereof along a portion of a substantially circular work path at a capping station, a rotary, vertically reciprocable chuck supported above said station, said chuck having jaw means at its lower end and operating means for opening and closing said jaw means, a source of screw-type caps for said containers, means for continuously rotating said chuck about its axis, feeding means mounted in juxtaposition with said chuck and movable to a position adjacent said source for receiving a cap therefrom and inserting the same within said jaw means, detecting means including a rock shaft reciprocably supported adjacent said chuck along a vertical axis outside said circular work path, said detecting means having a laterally movable portion thereon for detecting the presence of a container at said capping station, first control means for moving said chuck downwardly toward said capping station to apply the cap within said jaw means to a container at said station, said operating means automatically opening said jaw means upon the application of each said cap to its container with a predetermined tightness, second control means movably supported by said chuck for conditioning the same for the reciept of a succeeding cap from said source, and means controlled by said detecting means and responsive to the absence of a container at said capping station for rendering said second control means ineffective to condition said chuck and for preventing movement of said feeding means to its position adjacent said source, to thereby prevent the receipt of said succeeding cap by said chuck until a container is advanced to said capping station.

20. In a machine of the character set forth in claim 19, in combination, means for varying the rate of rotation of said chuck, to thereby vary the rate at which said caps are applied to said containers.

21. In a capping machine, in combination, means for advancing successive containers from a supply thereof to a capping station, a vertically reciprocable chuck supported above said station, said chuck having jaw means at its lower end and operating means for opening and closing said jaw means, a source of caps for said containers, feeding means mounted in juxtaposition with said chuck and including a cap-receiving portion laterally movable about a vertical axis to a position adjacent said source for receiving a cap therefrom and inserting the same within said jaw means, said feeding means including a container-engaging portion laterally movable about said vertical axis into engagement with each container advanced to said capping station and also being movable beyond the normal container-engaging position in cases in which no container is at said station, first control means for moving said chuck downwardly toward said capping station to apply the cap within said jaw means to a container at said station, said operating means opening said jaw means upon the application of each said cap to its container, second control means movable with said chuck and also reciprocably movable with respect thereto for conditioning said operating means for the receipt of a succeeding cap by said jaw means, and means effective upon the movement of said container-engaging portion beyond said normal position for preventing movement of said cap-receiving portion to its position adjacent said source, to thereby prevent the receipt of a succeeding cap therefrom until a container is advanced to said capping station.

22. In a capping machine, in combination, means for advancing successive containers from a supply thereof to a capping station, a vertically reciprocable chuck supported above said station, said chuck having jaw means at its lower end and operating means for opening and closing said jaw means, a source of caps for said containers, feeding means mounted in juxtaposition with said chuck and including a cap-receiving portion pivotally movable about a vertical axis to a position adjacent said source for receiving a cap therefrom and inserting the same within said jaw means, said feeding means including a container-engaging portion pivotally movable about said vertical axis into engagement with each container advanced to said capping station and also being movable beyond the normal container-engaging position in cases in which no container is at said station, first control means for moving said chuck downwardly toward said capping station to apply the cap within said jaw means to a container at said station, said operating means opening said jaw means upon the application of each said cap to its container, second control means supported by said chuck for closing said jaw means upon the insertion of a cap therein by said feeding means, means responsive to the improper positioning of a container at said capping station for enabling said chuck to remain above its lowermost, cap-applying position until the container is properly located at said station, and means effective upon the movement of said container-engaging portion beyond said normal position for preventing movement of said cap-receiving portion to its position adjacent said source, to thereby prevent the receipt of a succeeding cap therefrom until a container is advanced to said capping station.

23. In a capping machine, in combination, means for advancing successive containers from a supply thereof to a capping station, a rotary, vertically reciprocable chuck supported above said station, said chuck having jaw means at its lower end and operating means for opening and closing said jaw means, a source of caps for said containers, means mounted adjacent said chuck and including a cap-receiving portion and a container-engaging portion, said cap-receiving portion being laterally movable about a vertical axis to a position adjacent said source for receiving a cap therefrom and inserting the same within said jaw means and said container-engaging portion being laterally movable about said vertical axis into engagement with each container advanced to said capping station and also being movable beyond the normal container-engaging position in cases in which no container is at said station, first control means for moving said chuck downwardly toward said capping station to apply the cap within said jaw means to a container at said station, said operating means opening said jaw means upon the application of each said cap to its container, second control means supported by said chuck and reciprocably movable with respect thereto for conditioning the same for the receipt of a succeeding cap from said source, means responsive to the improper positioning of a container at said capping station for enabling said chuck to remain above its lowermost, cap-applying position until the container is properly located at said station, and means effective upon the movement of said container-engaging portion beyond said normal position for rendering said second control means ineffective to condition said chuck and for preventing movement of said cap-receiving portion to its position adjacent said source, to thereby prevent the receipt of said succeeding cap by said chuck until a container is advanced to said capping station.

24. In a machine for applying closure elements to a series of containers presented therebeneath, in combination, means for advancing successive containers from a supply thereof to a capping station, a rotary, vertically reciprocable chuck supported above said station, said chuck having jaw means at its lower end and operating means for opening and closing said jaw means, a source of closure elements for said containers, a vertically reciprocable arm mechanism pivotally mounted adjacent said chuck and including an element-receiving portion and a container-engaging portion, said element-receiving portion being laterally movable about a vertical axis to a position adjacent said source for receiving a closure element therefrom and inserting the same within said jaw means and said container-engaging portion being laterally movable about a vertical axis into engagement with each container advanced to said capping station and also being movable beyond the normal container-engaging position in cases in which no container is at said station, first control means for moving said arm mechanism and said chuck downwardly to orient said container-engaging portion adjacent said capping station and to apply the closure element within said jaw means to a container at said station, additional control means for pivoting said arm mechainsm to move the container-engaging portion thereof in a lateral direction into contact with the container at said station immediately prior to the application of the closure element thereto, said operating means opening said jaw means upon the application of each said closure element to its container, second control means supported by said chuck and reciprocably movable with respect thereto for conditioning the same for the receipt of a succeeding closure element from said source, means responsive to the improper positioning of a container at said capping station for enabling said chuck to remain above its lowermost, cap-applying position until the container is properly located at said station, and means effective upon the movement of said container-engaging portion beyond said normal position for preventing movement of said element-receiving portion to its position adjacent said source, to thereby prevent the receipt of a succeeding closure element therefrom until a container is advanced to said capping station.

25. A machine for applying closure elements to a series of containers presented therebeneath, comprising, in combination, a rotary turret for receiving successive container from a supply thereof, means defining a substantially circular work path for the containers beneath said turret, a plurality of vertically reciprocable chucks mounted around said turret adjacent its periphery and respectively positioned above and in substantial vertical alignment with said containers, each of said chucks having jaw means at the lower end thereof and operating means for opening and closing said jaw means, means including a rock shaft reciprocably supported on said turret adjacent each of said chucks along a vertical axis outside said substantially circular work path, said last-mentioned means having a container-engaging portion radially movable in an inward direction into contact with a container beneath the corresponding chuck, a source of closure elements for said containers, feeding means carried by said turret for receiving successive closure elements from said source and inserting the same within the jaw means of said chucks, means for rotating said turret, first control means responsive to the rotation of said turret for moving each of said chucks downwardly to apply the closure element within its said jaw means to the container therefor, said operating means opening the chuck jaw means upon the application of said closure element to said container, second control means, one for each of said chucks, for conditioning the same for the receipt of a succeeding closure element from said source, and means responsive to the absence of a container beneath a particular chuck for rendering said second control means ineffective to condition said chuck and for preventing the receipt of a succeeding closure element by said feeding means.

26. A machine for applying closure elements to a series of containers presented therebeneath, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, a source of closure elements for said containers, a plurality of feeding mechanisms, one for each of said chucks, for receiving successive closure elements from said source and positioning each said element beneath the associated chuck, means for rotating said turret, first control means responsive to the rotation of said turret for moving each of said chucks in a downward direction relative to its camming member to enable movement of the chuck jaw means to their closed position to grip the closure element therebeneath and for then continuing the downward movement of each chuck to apply the gripped closure element to the container therefor, said operating means opening the chuck jaw means upon the application of said closure element to said container with a predetermined tightness, said first control means thereafter moving the opened chuck in an upward direction away from said container, and second control means supported by each of said chucks and reciprocably movable with respect thereto for engaging the camming member therefor during an initial portion of the chuck's upward movement to condition said chuck for the receipt of a succeeding closure element from said source and to insure that said jaw means are in their open position.

27. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, a source of caps for said containers, a plurality of vertically reciprocable feeding mechanisms mounted on said turret, one of said mechanisms being provided for each of said chucks, each of said mechanisms including means for receiving one of the caps from said source and positioning the same beneath the associated chuck, means for rotating said turret, first control means responsive to the rotation of said turret for controlling the reciprocable, vertical movement of said feeding mechanisms and said chucks, and second control means responsive to the vertical positions of said feeding mechanisms and said chucks for maintaining each of said camming members in a vertically stationary position during a portion of the downward movement of the associated chuck by said first control means, to enable movement of the chuck jaw means to their closed position to grip the cap therebeneath, said first control means thereafter continuing the downward movement of each chuck, together with the camming member therefor, to apply the gripped cap to the corresponding container, said operating means urging said jaw means to their open position upon the application of said cap to said container with a predetermined tightness.

28. A machine for applying screw-type closure elements to a series of containers presented therebeneath, comprising, in combination, a rotary turret for receiving successive containers from a supply thereof, a plurality of rotary, vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means for continuously rotating said chucks relative to said turret, a source of screw-type closure elements for said containers, a plurality of vertically reciprocable feeding mechanisms mounted on said turret, one of said mechanisms being provided for each of said chucks, each of said mechanisms including means for receiving one of the closure elements from said source and positioning the same beneath the associated chuck, means for rotating said turret, first control means operable in response to the rotation of said turret for controlling the reciprocable, vertical movement of said feeding mechanisms and said chucks, said first control means moving each of said feeding mechanisms to a position adjacent said source for receiving a closure element therefrom, thereafter moving each said chuck in a downward direction relative to its camming member to enable movement of the chuck jaw means to their closed position to grip the closure element and then continuing the downward movement of each chuck, together with the camming member therefor, to apply the gripped closure element to the container therebeneath, said operating means urging the jaw means to their open position upon the application of said closure element to said container, and second control means responsive to the vertical positions of said feeding mechanisms and said chucks for conditioning said chucks for the receipt of a succeeding closure element.

29. In a machine of the character set forth in claim 28, in combination, said first control means moving each of said chucks in an upward direction upon the application of a closure element thereby to a container, said second control means maintaining the camming member for each chuck in a vertically stationary position during an initial portion of said upward movement, to insure that the chuck jaw means are in their open position.

30. In a machine of the character set forth in claim 28, in combination, means including a rotatable gear concentric with said turret for continuously rotating said chucks, and means for varying the rate of rotation of said gear with respect to said turret, to thereby vary the rate of rotation of said chucks.

31. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the low end thereof and operating means including a camming member for opening and closing said jaw means, means including a plurality of elongated, vertically reciprocable rods respectively carried by said chucks in position to engage said camming members, a source of caps for said containers, a plurality of vertically reciprocable feeding mechanisms mounted on said turret, one of said mechanisms being provided for each of said chucks, each of said mechanisms including means for receiving one of the caps from said source and positioning the same beneath the associated chuck, means for rotating said turret, first control means responsive to the rotation of said turret for controlling the reciprocable, vertical movement of said feeding mechanisms and said chucks, and second control means responsive to the vertical positions of said feeding mechanisms and said chucks for controlling the reciprocable, vertical movement of said elongated rods, said second control means maintaining each of said rods in engagement with the camming members therefor to hold the jaw means for the associated chuck in their open position until the corresponding feeding mechanism moves a cap therebeneath, said first control means thereafter moving each said chuck in a downward direction relative to its camming member, to enable movement of the chuck jaw means to their closed position to grip the cap, and then continuing the downward movement of each chuck, together with the camming member therefor, to apply the gripped cap to the container therebeneath, said operating means urging the jaw means to their open position upon the application of said cap to said container.

32. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means thereon and operating means including a camming member for opening and closing said jaw means, means including a plurality of elongated rods respectively reciprocably supported by said chucks in position to engage said camming members, a source of caps for said containers, a plurality of vertically reciprocable arm mechanisms mounted on said turret, one of said mechanisms being provided for each of said chucks, each of said mechanisms including means for receiving one of the caps from said source and positioning the same beneath the associated chuck, means for rotating said turret, first control means operable in response to the rotation of said turret for controlling the reciprocable, vertical movement of said arm mechanisms and said chucks, and second control means responsive to the vertical positions of said arm mechanisms and said chucks for controlling the reciprocable movement of said elongated rods, said second control means maintaining each of said rods in engagement with the camming member therefor to hold the jaw means for the associated chuck in their open position until the corresponding arm mechanism moves a cap therebeneath, said first control means thereafter moving each said chuck in a downward direction relative to its rod and camming member, to enable movement of the chuck jaw means to their closed position to grip the cap, and then continuing the downward movement of each chuck, together with the rod and camming member therefor, to apply the gripped cap to the corresponding container, said operating means urging the jaw means to their open position upon the application of said cap to said container, said second control means preventing upward movement of said rod and camming member as said first control means begins to carry said chuck upwardly away from the capped container, to thereby condition said chuck for the receipt of a succeeding cap.

33. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated rods respectively supported by said chucks for reciprocable, vertical movement with respect thereto, each of said rods being carried in position to engage the camming member for the associated chuck, a source of caps for said containers, a plurality of vertically reciprocable arm mechanisms mounted on said turret, one of said mechanisms being provided for each of said chucks, each of said mechanisms including means for receiving one of the caps from said source and positioning the same beneath the associated chuck, means for rotating said turret, first control means responsive to the rotation of said turret for controlling the reciprocable, vertical movement of said arm mechanisms and said chucks, said first control means moving each of said arm mechanisms to a position adjacent said source for receiving a cap therefrom, and second control means responsive to the vertical positions of said arm mechanisms and said chucks for controlling the reciprocable, vertical movement of elongated rods, said second control means maintaining each of said rods in engagement with the camming member therefor to hold the jaw means for the associated chuck in their open position until the corresponding arm mechanism moves a cap therebeneath, said first control means thereafter moving each said chuck in a downward direction relative to its camming member, to enable movement of the chuck jaw means to their closed position to grip the cap, and then continuing the downward movement of each chuck, together with the camming member therefor, to apply the gripped cap to the corresponding container, said operating means urging the jaw means to their open position upon the application of said cap to said container with a predetermined tightness, said second control means preventing upward movement of said camming member as said first control means begins to carry said chuck toward its uppermost positon, to thereby condition said chuck for the receipt of a succeeding cap and to insure that said jaw means are in their open position.

34. In a capping machine of the character set forth in claim 33, in combination, a separate one of said second control means being provided for each of said chucks, and means for moving each of said second control means in a lateral direction relative to the associated chuck to prevent reciprocable, vertical movement of the corresponding elongated rod with respect thereto.

35. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated rods respectively supported by said chucks for reciprocable, vertical movement with respect thereto, each of said rods being carried in position to engage the camming member for the associated chuck, a source of caps for said containers, a plurality of vertically reciprocable arm mechanisms mounted on said turret, one of said mechanisms being provided for each of said chucks, each of said mechanisms including means for receiving one of the caps from said source and positioning the same beneath the associated chuck, means for rotating said turret, first control means responsive to the rotation of said turret for controlling the reciprocable, vertical movement of said arm mechanisms and said chucks, said first control means moving each of said arm mechanisms to a position adjacent said source for receiving a cap therefrom, second control means responsive to the vertical positions of said arm mechanisms and said chucks for controlling the reciprocable, vertical movement of said elongated rods, a separate one of said second control means being provided for each of said chucks, the second control means for each chuck maintaining the elongated rod supported thereby in engagement with its camming member to hold the jaw means for the associated chuck in their open position until the corresponding arm mechanism moves a cap therebeneath, said first control means thereafter moving each said chuck in a downward direction relative to the camming member therefor, to enable movement of the chuck jaw means to their closed position to grip the cap, and then continuing the downward movement of each chuck, together with the camming member therefor, to apply the gripped cap to the corresponding container, said operating means urging the jaw means to their open position upon the application of said cap to said container with a predetermined tightness, said second control means preventing upward movement of said camming member as said first control means begins to carry said chuck toward its uppermost position, to thereby condition said chuck for the receipt of a succeeding cap and to ininsure that said jaw means are in their open position, cam means for moving each of said second control means in a lateral direction relative to the associated chuck at a predetermined point in the machine cycle to prevent reciprocable, vertical movement of the corresponding elongated rod with respect to said associated chuck, and means for similarly moving a selected one of said second control means in said lateral direction in response to the absence of a container beneath the associated chuck.

36. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated rods respectively reciprocably supported by said chucks in position to engage said camming members, a source of caps for said containers, a plurality of vertically reciprocable arm mechanisms mounted on said turret, one of said arm mechanisms being provided for each of said chucks, each of said arm mechanisms being pivotally movable with respect to said turret and including a protruding portion for receiving one of the caps from said source, means for rotating said turret, first control means responsive to the rotation of said turret for pivoting each of said arm mechanisms in a direction to position the cap received by the protruding portion thereof beneath the associated chuck, second control means operable in response to the rotation of said turret for controlling the reciprocable, vertical movement of said arm mechanisms and said chucks, and third control means responsive to the vertical positions of said arm mechanisms and said chucks for controlling the reciprocable movement of said elongated rods, said third control means maintaining each of said rods in engagement with the camming member therefor to hold the jaw means for the associated chuck in their open position until the corresponding arm mechanism moves a cap therebeneath, said second control means thereafter moving each said chuck in a downward direction relative to its rod and camming member, to enable movement of the chuck jaw means to their closed position to grip the cap, and then continuing the downward movement of each chuck, together with the rod and camming member therefor, to apply the gripped cap to the corresponding container, said operating means urging the jaw means to their open position upon the application of said cap to said container, said third control means preventing upward movement of said rod and camming member as said second control means begins to carry said chuck upwardly away from the capped container, to thereby condition said chuck for the receipt of a succeeding cap.

37. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means thereon and operating means including a camming member for opening and closing said jaw means, means including a plurality of elongated rods respectively supported by said chucks for reciprocable, vertical movement with respect thereto, each of said rods being carried in position to engage the camming member for the associated chuck, a source of caps for said containers, a plurality of vertically reciprocable arm mechanisms mounted on said turret, one of said arm mechanisms being provided for each of said chucks, each of said arm mechanisms being pivotally movable with respect to said turret and including a first portion laterally movable about a vertical axis for receiving one of the caps from said source and a second portion laterally movable about said vertical axis for urging the container beneath the associated chuck into contact with said turret, to maintain said container in fixed relationship therewith, means for rotating said turret, first control means responsive to the rotation of said turret for pivoting each of said arm mechanisms in one direction to position the cap received by the first portion thereof beneath the associated chuck, for thereafter pivoting each said arm mechanism in the opposite direction to move the second portion thereof to a position remote from the corresponding container and for then pivoting each said mechanism in said one direction to move said second portion in a lateral direction into contact with the corresponding container, second control means operable in response to the rotation of said turret for controlling the reciprocable, vertical movement of said arm mechanisms and said chucks, and third control means responsive to the vertical positions of said arm mechanisms and said chucks for controlling the reciprocable, vertical movement of said elongated rods, said third control means maintaining each of said rods in engagement with the camming member therefor to hold the jaw means for the associated chuck in their open position until the corresponding arm mechanism moves a cap therebeneath, said second control means thereafter moving each said chuck in a downward direction relative to its rod and camming member, to enable movement of the chuck jaw means to their closed position to grip the cap, and then continuing the downward movement of each chuck, together with the rod and camming member therefor, to apply the gripped cap to the corresponding container.

38. In a capping machine of the character set forth in claim 37, in combination, said second control means including means responsive to the improper positioning of a container beneath one of said chucks for enabling said one chuck to remain above its lowermost, cap-applying position until the container is properly located on said turret.

39. In a capping machine of the character set forth in claim 37, in combination, means effective in response to the absence of a container beneath one of said chucks for preventing the receipt of a succeeding cap by the first portion of the corresponding arm mechanism.

40. A capping machine, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated rods respectively supported by said chucks for reciprocable, vertical movement with respect thereto, each of said rods being carried in position to engage the camming member for the associated chuck, a source of caps for said containers, a plurality of vertically reciprocable arm mechanisms mounted on said turret, one of said arm mechanisms being provided for each of said chucks, each of said arm mechanisms being pivotally movable with respect to said turret and including a first portion laterally movable about a vertical axis for receiving one of the caps from said source and a second portion laterally movable about said vertical axis for urging a container beneath the associated chuck into contact with said turret, to maintain said container in fixed relationship therewith, means for rotating said turret, first control means responsive to the rotation of said turret for pivoting each of said arm mechanisms in one direction to position the cap received by the first portion thereof beneath the associated chuck, for thereafter pivoting each said arm mechanism in the opposite direction to move the second portion thereof to a position remote from the corresponding container and for then pivoting each said mechanism in said one direction to move said second portion in a lateral direction into contact with a container beneath the associated chuck and to enable said second portion to move beyond the normal container-contacting position in cases in which no container is beneath said chuck, second control means operable in response to the rotation of said turret for controlling the reciprocable, vertical movement of said arm mechanisms and said chucks, third control means responsive to the vertical positions of said arm mechanisms and said chucks for controlling the reciprocable, vertical movement of said elongated rods, said third control means maintaining each of said rods in engagement with the camming member therefor to hold the jaw means for the associated chuck in their open position until the corresponding arm mechanism moves a cap therebeneath, said second control means thereafter moving each said chuck in a downward direction relative to its rod and camming member, to enable movement of the chuck jaw means to their closed position to grip the cap, and then continuing the downward movement of each chuck, together with the rod and camming member therefor, to apply the gripped cap to the corresponding container, said operating means automatically urging said jaw means to their open position upon the application of said cap to said container, and means operable upon the movement of the second portion of a given arm mechanism beyond said normal container-contacting position for preventing the receipt of a succeeding cap by the first portion of said given arm mechanism and for rendering said third control means ineffective to move the associated elongated rod relative to its supporting chuck.

41. A capping machine for applying screw-type caps to a series of containers presented therebeneath, comprising, in combination, a rotary turret, means defining a substantially circular work path coaxial with said turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated, vertically reciprocable rods respectively supported by said chucks for reciprocable, vertical movement with respect thereto, each of said rods being carried in position to engage the camming member for the associated chuck, a source of screw-type caps for said containers, a plurality of vertically reciprocable arm mechanisms mounted on said turret along vertical axes outside said circular work path, one of said arm mechanisms being provided for each of said chucks, each of said arm mechanisms being pivotally movable with respect to said turret and including a first portion laterally movable about the vertical axis of the corresponding mechanism for receiving one of the caps from said source and a second portion laterally movable about said vertical axis for urging a container beneath the associated chuck into contact with said turret, to maintain the same in fixed relationship therewith, means for rotating said turret, first control means responsive to the rotation of said turret for pivoting each of said arm mechanisms in one direction to position the cap received by the first portion thereof beneath the associated chuck, for thereafter pivoting each said arm mechanism in the opposite direction to move the second portion thereof to a position remote from the corresponding container and for then pivoting each said mechanism in said one direction to move said second portion in a lateral direction into contact with a container beneath the associated chuck and to enable said second portion to move beyond the normal container-contacting position in cases in which no container is beneath said chuck, second control means operable in response to the rotation of said turret for controlling the reciprocable, vertical movement of said arm mechanisms and said chucks, third control means responsive to the vertical positions of said arm mechanisms and said chucks for controlling the reciprocable, vertical movement of said elongated rods, said third control means maintaining each of said rods in engagement with the camming member therefor to hold the jaw means for the associated chuck in their open position until the corresponding arm mechanism moves a cap therebeneath, said second control means thereafter moving each said chuck in a downward direction relative to its rod and camming member, to enable movement of the chuck jaw means to their closed position to grip the cap and then continuing the downward movement of each chuck, together with the rod and camming member therefor, to apply the gripped cap to the corresponding container, said operating means automatically urging said jaw means to their open position upon the application of said cap to said container with a predetermined tightness, said third control means preventing upward movement of said rod and camming member as said second control means begins to carry said chuck toward its uppermost position, to thereby condition said chuck for the receipt of a succeeding cap and to insure that said jaw means are in their open position, and means operable upon the movement of the second portion of a given arm mechanism beyond said normal container-contacting position for moving said third control means laterally to prevent the receipt of a succeeding cap by the first portion of said given arm mechanism and to render said third control means ineffective to move the associated elongated rod relative to its supporting chuck.

42. A capping machine for applying screw-type caps to a series of containers presented therebeneath, comprising, in combination, a rotary turret for receiving successive containers from a supply thereof, a plurality of vertically reciprocable chucks mounted around said turret adjacent its periphery and respectively positioned above and in substantial vertical alignment with said containers, each of said chucks having jaw means at the lower end thereof and operating means including a camming member for opening and closing said jaw means, means including a plurality of elongated, vertically reciprocable rods respectively supported by said chucks for reciprocable, vertical movement with respect thereto, each of said rods being carried in position to engage the camming member for the associated chuck, a source of screw-type caps for said containers, a plurality of vertically reciprocable arm mechanisms mounted on said turret, one of said arm mechanisms being provided for each of said chucks, each of said arm mechanisms being pivotally movable with respect to said turret and including a first portion for receiving one of the caps from said source and a second portion for urging a container beneath the associated chuck into contact with said turret, to maintain the same in fixed relationship therewith, means for rotating said turret, first control means responsive to the rotation of said turret for pivoting each of said arm mechanisms in one direction to position the cap received by the first portion thereof beneath the associated chuck, for thereafter pivoting each said arm mechanism in the opposite direction to move the second portion thereof to a position remote from the corresponding container and for then pivoting each said mechanism in said one direction to enable said second portion to urge a container beneath the associated chuck into contact with said turret and to enable said second portion to move beyond the normal container-contacting position in cases in which no container is beneath said chuck, second control means operable in response to the rotation of said turret for controlling the reciprocable, vertical movement of said arm mechanisms and said chucks, third control means responsive to the vertical positions of said arm mechanisms and said chucks for controlling the reciprocable, vertical movement of said elongated rods, said third control means maintaining each of said rods in engagement with the camming member therefor to hold the jaw means for the associated chuck in their open position until the corresponding arm mechanism moves a cap therebeneath, said second control means thereafter moving each said chuck in a downward direction relative to its rod and camming member, to enable movement of the chuck jaw means to their closed position to grip the cap and then continuing the downward movement of each chuck, together with the rod and camming member therefor, to apply the gripped cap to the corresponding container, said operating means automatically urging said jaw means to their open position upon the application of said cap to said container with a predetermined tightness, said third control means preventing upward movement of said rod and camming member as said second control means begins to carry said chuck toward its uppermost position, to thereby condition said chuck for the receipt of a succeeding cap and to insure that said jaw means are in their open position, and means including a stationary cam coaxially supported on said turret, said last-mentioned means being operable upon the movement of the second portion of a given arm mechanism beyond said normal container-contacting position for preventing the receipt of a succeeding cap by the first portion of said given arm mechanism and also being operable at a predetermined point in the machine cycle for rendering said third control means ineffective to move successive ones of elongated rods relative to their supporting chucks.

References Cited by the Examiner

UNITED STATES PATENTS 2,842,914  7/1958  Dimond _____ 53—67
3,031,822  5/1962  Dimond _____ 53—317
3,054,240  9/1962  Dimond _____ 53—308

TRAVIS S. McGEHEE, *Primary Examiner.*

A. E. FOURNIER, *Assistant Examiner.*